US012798243B2

(12) United States Patent

Tachibana et al.

(10) Patent No.: US 12,798,243 B2

(45) Date of Patent: Nov. 17, 2026

(54) MANUFACTURING METHOD OF LIQUID DISCHARGE HEAD, LIQUID DISCHARGE HEAD, RECORDING DEVICE

(71) Applicant: CANON KABUSHIKI KAISHA, Tokyo (JP)

(72) Inventors: Koji Tachibana, Kanagawa (JP); Takuya Iwano, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 123 days.

(21) Appl. No.: 18/912,972

(22) Filed: Oct. 11, 2024

(65) Prior Publication Data

US 2025/0135780 A1 May 1, 2025

(30) Foreign Application Priority Data

Oct. 31, 2023 (JP) ................................ 2023-186564

(51) Int. Cl.

*B41J 2/16* (2006.01)
*B41J 2/14* (2006.01)

(52) U.S. Cl.

CPC ......... *B41J 2/1623* (2013.01); *B41J 2/14233* (2013.01); *B41J 2/1433* (2013.01); *B41J 2/161* (2013.01); *B41J 2/162* (2013.01); *B41J 2002/14306* (2013.01)

(58) Field of Classification Search

None

See application file for complete search history.

(56) References Cited

U.S. PATENT DOCUMENTS

| | | | | |
|---|---|---|---|---|
| 11,104,132 B2 | 8/2021 | Kobayashi et al. | | |
| 2006/0265851 A1* | 11/2006 | Inaoka | B41J 2/14233 | 29/799 |
| 2013/0342605 A1* | 12/2013 | Eguchi | B41J 2/165 | 347/29 |
| 2017/0291417 A1* | 10/2017 | Okubo | B41J 2/14072 | |
| 2023/0130058 A1* | 4/2023 | Miwa | B41J 2/14233 | 347/47 |

FOREIGN PATENT DOCUMENTS

| | | |
|---|---|---|
| JP | 2015157360 A * | 9/2015 |
| JP | 2020-131627 A | 8/2020 |

OTHER PUBLICATIONS

English translation of JP 2015-157360A, publication date Sep. 3, 2015. (Year: 2015).*

* cited by examiner

*Primary Examiner* — Leslie J Thompson

(74) *Attorney, Agent, or Firm* — Venable LLP

(57) ABSTRACT

A manufacturing method of a liquid discharge head including a liquid discharge chip and a plate-shaped protective member. The liquid discharge chip includes a first substrate having a discharge port surface and a bonding surface, and a second substrate bonded to the bonding surface of the first substrate and having a supply flow-passage formed therein. The plate-shaped protective member protects the liquid discharge chip by being bonded to the discharge port surface, and in a state before being bonded to the liquid discharge chip, having a warp such that a center part of a first surface of the protective member becomes convex. The manufacturing method of the liquid discharge head includes a bonding process of bonding a second surface, which is on an opposite side to the first surface of the protective member in a warped state, to the discharge port surface.

18 Claims, 16 Drawing Sheets

MANUFACTURING METHOD OF LIQUID DISCHARGE HEAD, LIQUID DISCHARGE HEAD, RECORDING DEVICE

BACKGROUND OF THE INVENTION

Field of the Invention

The present invention relates to a liquid discharge head, a recording device including a liquid discharge head, and a manufacturing method of a liquid discharge head.

Description of the Related Art

As a liquid discharge head which discharges a liquid from a discharge port and forms an image on a recording medium, a configuration is known in which, in order to protect a surface of a liquid discharge chip (hereinafter, noted also as a "chip") where a discharge port is provided, a protective member is provided in the vicinity of the chip. Japanese Patent Application Publication No. 2020-131627 discloses a configuration in which a cover as the protective member is bonded to the chip by an adhesive.

SUMMARY OF THE INVENTION

In the configuration as described above, in order to shorten a distance between a discharge port and a recording medium for the sake of suppressing a kink in an image and for the sake of structural reliability against an external force, a structure obtained by machining a thin-plate like metal is used as the protective member in some cases. When a coil material is used as a raw material for the protective member, a warp deriving from the coil material is present in the protective member. In such a case, since the protective member is bonded to a chip in a flattened state, a spring reaction force is generated in the protective member after the bonding, hence a stress is applied to a bonded part between the protective member and the chip, or a bonded part between each of substrates constituting the chip. Depending on a direction of the warp of the protective member, the stress acts on an end part of each of the bonded parts in a direction of peeling each of the members from each other. There is a concern that separation between the protective member and the chip and the separation between the substrates of the chip would lead to occurrence of defective discharge of the liquid discharge head or of an electrical failure.

The present invention has an object to suppress breakage of a liquid discharge head in view of the aforementioned problem.

In order to achieve the object described above, a manufacturing method of a liquid discharge head including a liquid discharge chip and a protective member, the liquid discharge chip including a first substrate having a discharge port surface, in which a plurality of discharge ports discharging a liquid are formed, and a bonding surface, which faces in a direction opposite to the discharge port surface, and a second substrate bonded to the bonding surface of the first substrate and having a supply flow-passage formed therein for supplying the liquid toward the discharge port; the protective member having an opening formed at a position overlapping the discharge port when viewed in a direction perpendicular to the discharge port surface, and protecting the liquid discharge chip by being bonded to the discharge port surface; and moreover, in a state before being bonded to the liquid discharge chip, having a warp such that a center part of a first surface of the protective member becomes convex, the manufacturing method of the liquid discharge head includes a bonding process of bonding a second surface, which is on an opposite side to the first surface of the protective member, to the discharge port surface.

Moreover, in order to achieve the object described above, a liquid discharge head according to the present invention includes:

a liquid discharge chip in which a plurality of discharge ports discharging a liquid are aligned in a first direction and constitute a discharge port row, the liquid discharge head including a first substrate having a discharge port surface, in which the discharge ports are formed, and a bonding surface, which faces in a direction opposite to the discharge port surface, and a second substrate bonded to the bonding surface of the first substrate and having a supply flow-passage formed therein for supplying the liquid toward the discharge port is formed; and a plate-shaped protective member having an opening formed at a position overlapping the discharge port when viewed in a direction perpendicular to the discharge port surface and being bonded to the discharge port surface and protecting the liquid discharge chip, the protective member having an asymmetrical shape relative to a center line in the first direction and an asymmetrical shape relative to a center line in a second direction parallel to the discharge port surface and orthogonal to the first direction.

According to the present invention, the breakage of the liquid discharge head can be suppressed.

Further features of the present invention will become apparent from the following description of exemplary embodiments with reference to the attached drawings.

DESCRIPTION OF THE EMBODIMENTS

Hereinafter, a description will be given, with reference to the drawings, of embodiments (examples) of the present invention. However, the sizes, materials, shapes, their relative arrangements, or the like of constituents described in the embodiments may be appropriately changed according to the configurations, various conditions, or the like of apparatuses to which the invention is applied. Therefore, the sizes, materials, shapes, their relative arrangements, or the like of the constituents described in the embodiments do not intend to limit the scope of the invention to the following embodiments. In addition, not all features described in the following embodiments are essential to solutions provided by the invention.

Hereinafter, as an application example of the present invention, an embodiment in which the present invention is applied to an inkjet recording head which discharges an ink and an inkjet recording device (hereinafter noted also as a "recording device") will be explained, but the present invention is not limited to this. For example, a liquid discharge head and a liquid discharge device of the present invention can be applied to devices such as a printer, a copier, a facsimile having a communication system, a word processor having a printer portion and moreover, to an industrial recording device which is combined with various processing devices in a complex manner. Furthermore, it can be also used for applications such as creation of a biochip, electronic circuit printing and the like, for example.

Moreover, in the following embodiments, as a liquid discharge method of the liquid discharge head, a method of discharging a liquid by driving of a piezo element is adopted, but the present invention is not limited to this. For example, the present invention can be applied also to the liquid discharge heads of a thermal method in which the liquid is discharged by air bubbles generated by a heater element and the other various liquid discharge methods are adopted.

Moreover, in the following embodiments, an inkjet recording device is constituted capable of circulating the liquid such as ink between a tank and the liquid discharge head, but the present invention is not limited to this. For example, the present invention can be applied also to a liquid discharge head in such a form that two tanks are provided on an upstream side and a downstream side of the liquid discharge head so that the ink in a pressure chamber flows by causing the ink to flow from one of the tanks to the other tank without circulating the ink.

First Embodiment

Liquid Discharge Device

Figure 1:
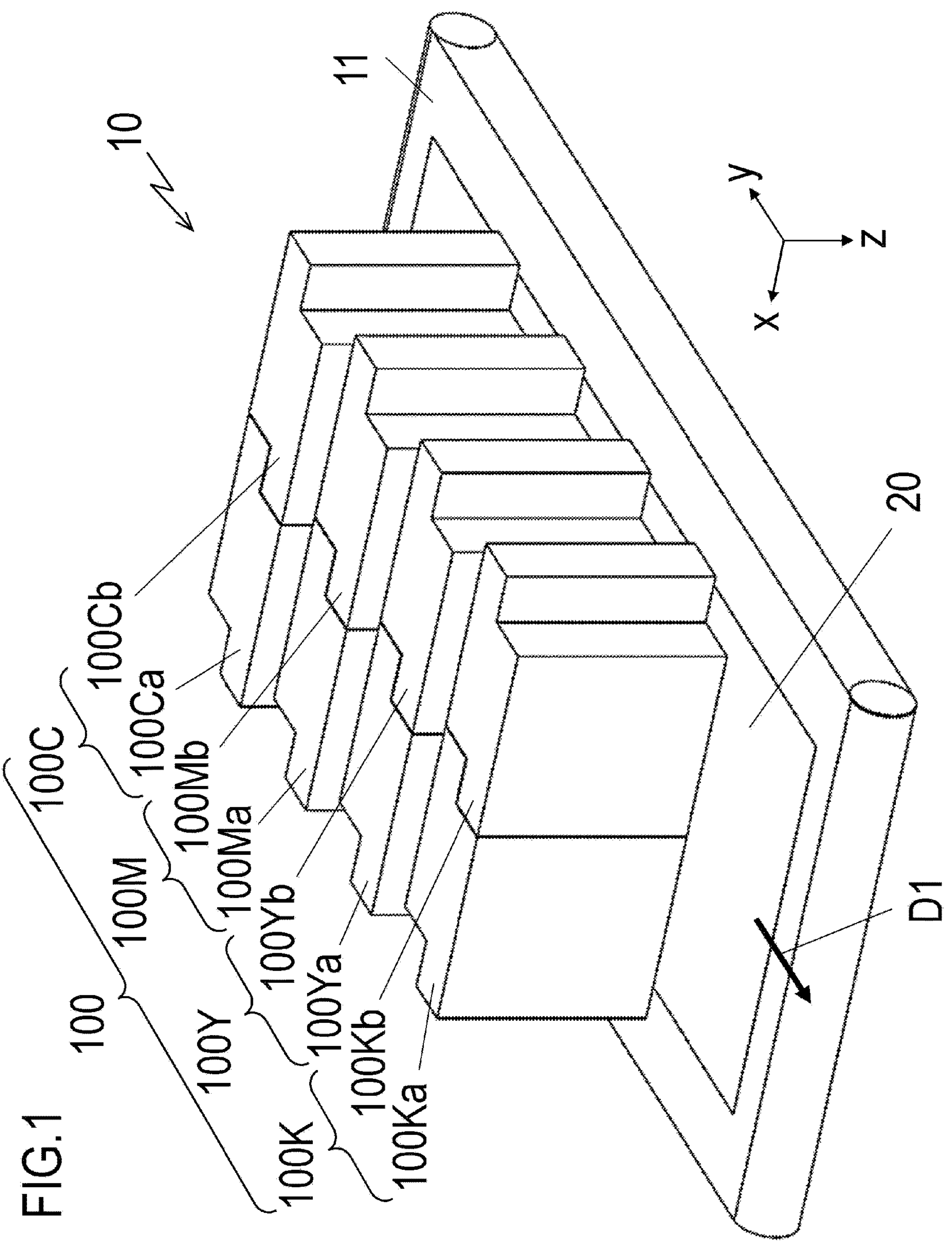
FIG. 1 is a schematic view of a recording device of a first embodiment.

FIG. 1 is a perspective view schematically illustrating a recording device 10 as a liquid discharge device according to a first embodiment of the present invention.

The recording device 10 includes conveying means 11 that conveys a recording medium 20 in a conveyance direction D1, and a liquid discharge head 100 (hereinafter also noted as a "head") which discharges the ink (liquid) onto the recording medium 20. The recording device 10 is a so-called full-line type inkjet recording device which records an image on the recording medium 20 by discharging the ink (liquid) from the liquid discharge head 100 disposed at a certain position, while continuously conveying the recording medium 20 by the conveying means 11.

Note that the axes of x, y, z described as appropriate in each drawing which will be referred to in the following explanation indicate coordinate axes in the recording device 10, and an x-axis indicates a first axis, a y-axis for the second axis, and a z-axis for the third axis, respectively. Each of the axis of x, y, z is orthogonal to one another. The x-axis direction (first direction) indicates an alignment direction of a discharge port in the liquid discharge head 100, the y-axis direction (second direction) indicates a direction parallel to the conveyance direction D1 of the recording medium 20, and the z-axis direction (third direction) indicates a discharge direction of ink by a liquid discharge portion 1. Hereinafter, when the liquid discharge head 100 and its constituent members are explained by using each axis, the explanation will be made with an attitude in which the liquid discharge head 100 is attached to the recording device 10 as a reference.

The liquid discharge head 100 is disposed such that the discharge ports (hereinafter, noted also as nozzles) capable of discharging the ink by color are aligned over the entire width of the recording medium 20, and a row in each color is disposed along the conveyance direction D1 (y-axis direction) of the recording medium 20. Note that, in the first embodiment, a width direction of the recording medium 20 to be conveyed is parallel to the x-axis direction.

The recording device 10 in the first embodiment is constituted capable of forming a full-colored image by discharging ink in four colors of black (K), yellow (Y), magenta (M), and cyan (C). Therefore, the recording device 10 includes a head 100K for discharging the black ink, a head 100Y for discharging the yellow ink, a head 100M for discharging the magenta ink, and a head 100C for discharging the cyan ink.

The liquid discharge head row corresponding to the discharge of each ink color indicated in FIG. 1 has a constitution that two heads are combined, respectively. For example, the head 100K for discharging the black ink has such a configuration that a head 100Ka and a head 100Kb are disposed along the x-axis direction (first direction) orthogonal to the conveyance direction (y-axis direction, second direction). The head 100Ka and the head 100Kb have an identical configuration. Moreover, the same applies to a discharge module corresponding to discharge of the other ink colors. Specifically, a head 100Ya and a head 100Yb for the yellow ink discharge have the identical configuration, a head 100Ma and a head 100Mb for the magenta ink discharge have the identical configuration, and a head 100Ca and a head 100Cb for the cyan ink discharge have the identical configuration.

Liquid Discharge Head

Subsequently, a configuration of the liquid discharge head 100 according to the first embodiment will be explained. Since each of the heads 100K, 100Y, 100M, 100C is similarly constituted, in the following explanation, the liquid discharge head 100 is not distinguished by color but comprehensively explained by omitting signs distinguishing the color.

Figure 2:
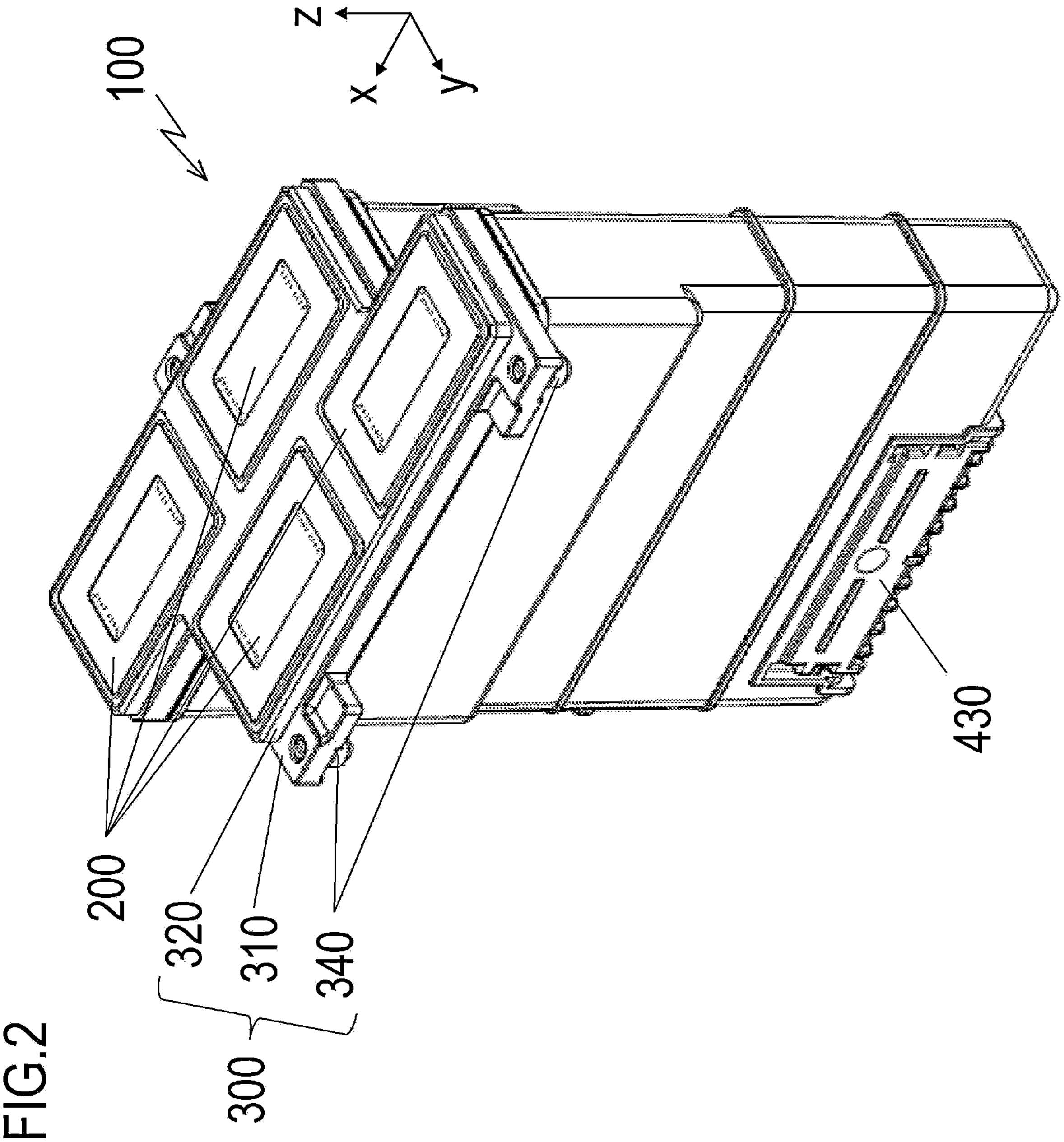
FIG. 2 is a perspective view of the liquid discharge head of the first embodiment.
Figure 3:
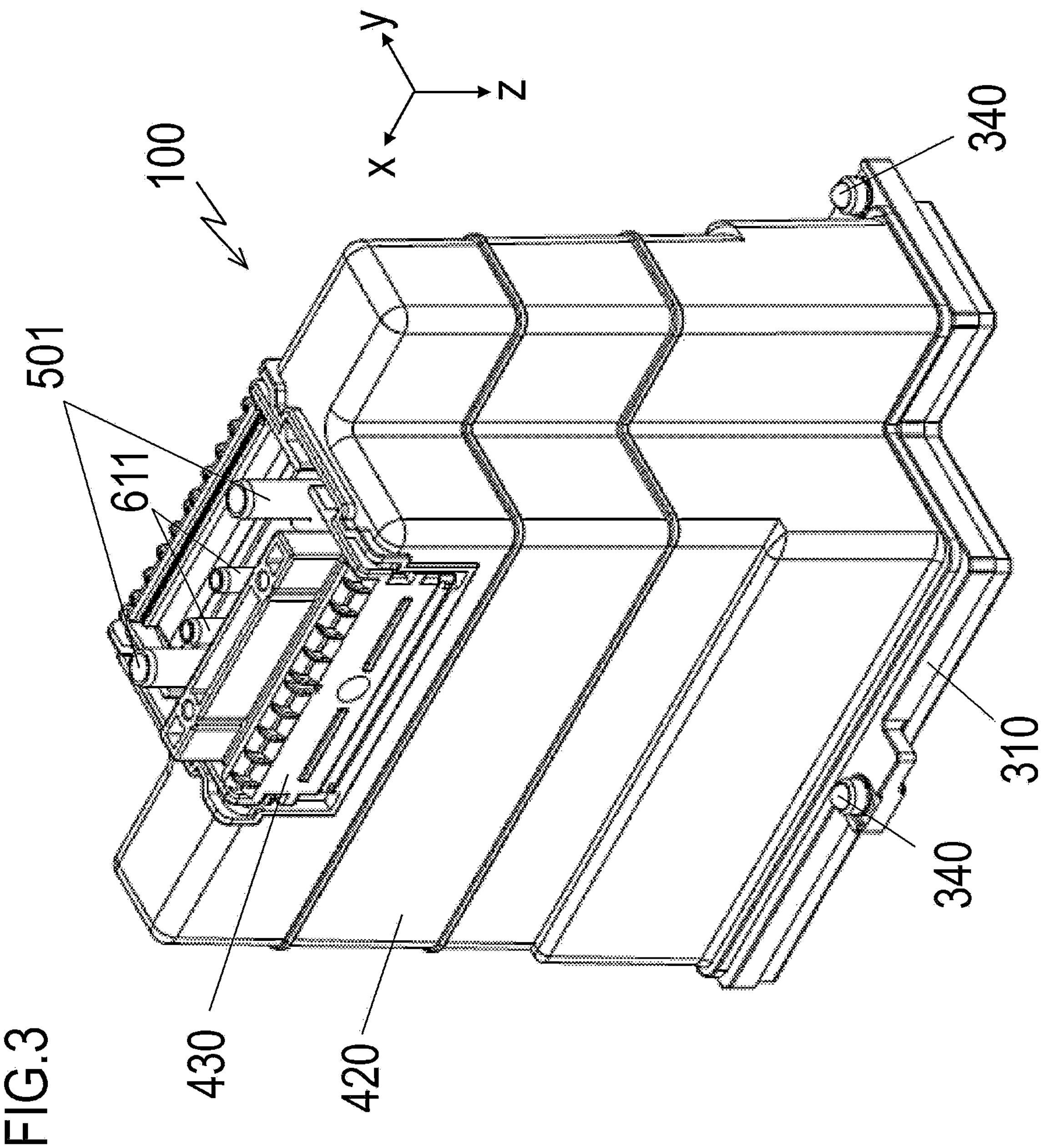
FIG. 3 is a perspective view of the liquid discharge head of the first embodiment.

FIG. 2 is a perspective view of the liquid discharge head 100 viewed from a discharge port surface side on which a liquid discharge unit 200 is provided. FIG. 3 is a perspective view of the liquid discharge head 100 viewed from a surface side facing the side opposite to the discharge port surface.

Figure 4:
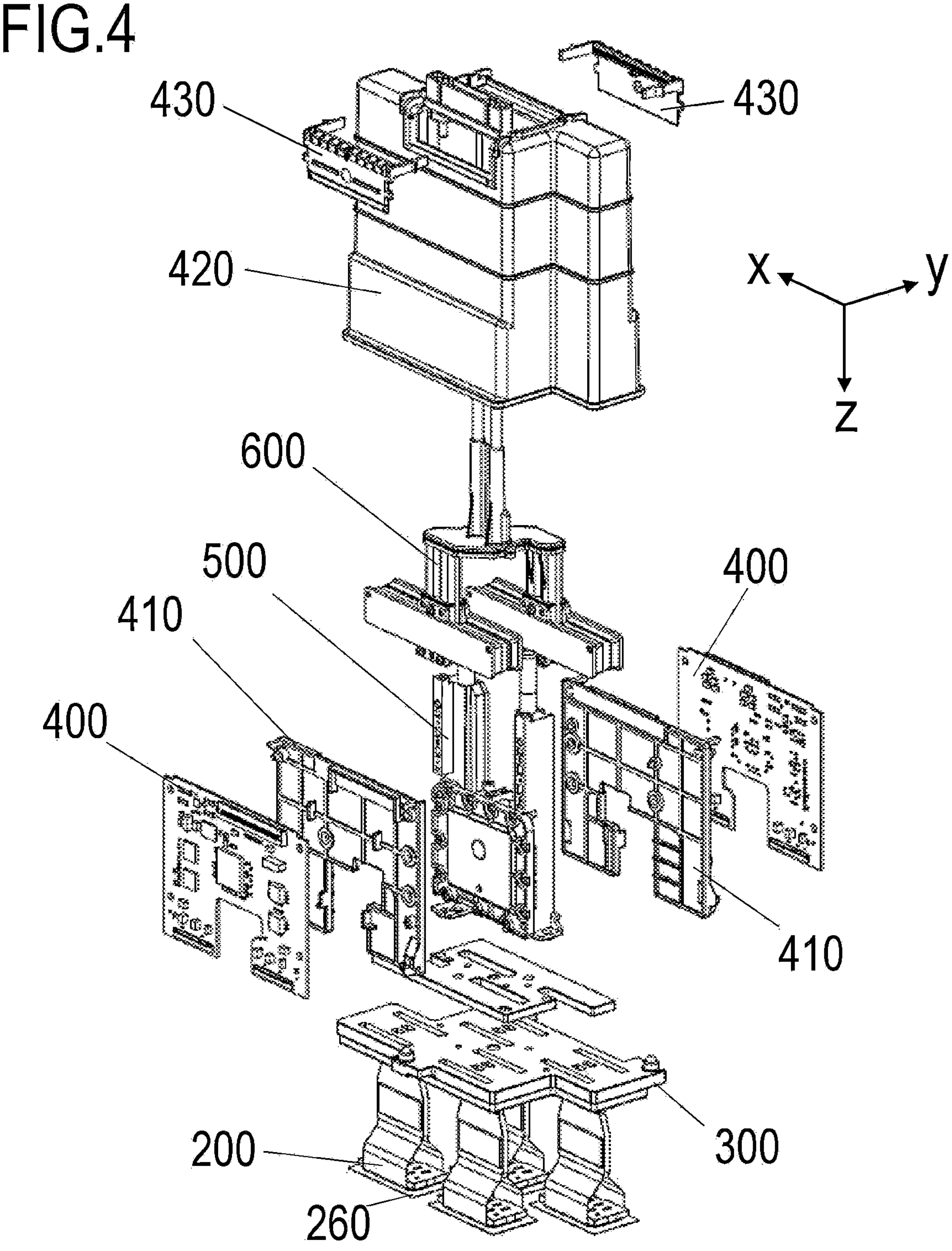
FIG. 4 is an exploded perspective view of the liquid discharge head of the first embodiment.

FIG. 4 is an exploded perspective view of the liquid discharge head 100 viewed from the same side as that in FIG. 3.

The liquid discharge head 100 includes a plurality of the liquid discharge units 200 in which a discharge port for discharging a liquid such as ink is provided and a base unit 300 that supports the liquid discharge unit 200. In the first embodiment, four units of the liquid discharge units 200 are provided for one unit of the liquid discharge head 100. Moreover, the base unit 300 is constituted by including a base member 310, a frame member 320, and a reference member 340.

In the liquid discharge head 100, as shown in FIG. 2, four units of the liquid discharge units 200 are aligned in a staggered manner on the base member 310. Specifically, on the base member 310, two rows of unit rows, each row constituted by two units of the liquid discharge units 200 aligned in the x-axis direction, are provided by being aligned in the y-axis direction. And the two liquid discharge units 200 adjacent in the y-axis direction are disposed by being shifted from each other in the x-axis direction. The liquid discharge unit 200 and the base member 310 are provided on an end part in the z-axis direction of the liquid discharge head 100.

To the base member 310, the frame member 320 is bonded. The frame member 320 has a frame-body structure supporting the end part of a protective member 260 and is provided on the end part in the z-axis direction of the liquid discharge head 100. The protective member 260 is one of the constituent elements of the liquid discharge unit 200, and details of the constitution will be described later. The frame member 320 according to the first embodiment is formed so as to support a plurality of the protective members 260 by one member but may be formed by being divided for each of the protective members 260.

To the base member 310, the reference member 340 is further bonded. The reference member 340 is a positioning member to be a reference for positioning the liquid discharge head 100 on the recording device 10. In the first embodiment, three pieces of the reference members 340 are bonded to the base member 310. The reference member 340 is disposed so as to protrude from a surface facing a direction opposite to the surface of the base member 310 on which the frame member 320 is bonded to a direction opposite to a discharge direction of the liquid. One piece of the reference member 340 is provided on one end part in the x-axis direction and one end part in the y-axis direction of the base member 310, and one piece of the reference member 340 is provided on the other end part in the x-axis direction and the one end part in the y-axis direction of the base member 310. Moreover, another reference member 340 is provided on a center part in the x-axis direction and the other end part in the y-axis direction of the base member 310.

An exterior part of the liquid discharge head 100 is constituted by a cover 420 and an electric-connection portion cover 430 for covering and protecting an electric substrate, an electric connection portion and the like. In the cover 420, a liquid connection portion 501 and a refrigerant-connection portion 611 are provided. The liquid connection portion 501 is provided for supplying the ink into the liquid discharge head 100, and the refrigerant-connection portion 611 is provided for supplying a refrigerant into the liquid discharge head 100. The electric-connection portion cover 430, the liquid connection portion 501, and the refrigerant-connection portion 611 are end parts in the z-axis direction of the liquid discharge head 100 and provided on an end part on a side opposite to the end part on which the liquid discharge unit 200 and the base member 310 are provided.

Inside the discharge head 100, the base unit 300, an electric-wiring substrate 400 and a holding member 410 for holding it, a liquid supply unit 500, and a cooling unit 600 are provided.

In the first embodiment, two pieces of the electric-wiring substrates 400 for sending an electric signal to the liquid discharge unit 200 are provided, and each of them is held by the different holding members 410.

The liquid supply unit 500 is a supply portion for supplying the liquid to the liquid discharge unit 200 via the base unit 300. The liquid supply unit 500 is disposed so as to be sandwiched by the two holding members 410. And on outer side of each of the holding members 410 (side opposite to a surface opposing to the liquid supply unit 500), the electric-wiring substrate 400 is provided.

The cooling unit 600 is a cooling portion for cooling a drive circuit. In the first embodiment, the electric-wiring substrate 400, the holding member 410, the liquid supply unit 500, and the cooling unit 600 are all covered by the cover 420 and the electric-connection portion cover 430.

Explanation of Constitution of Liquid Discharge Unit

Figure 5:
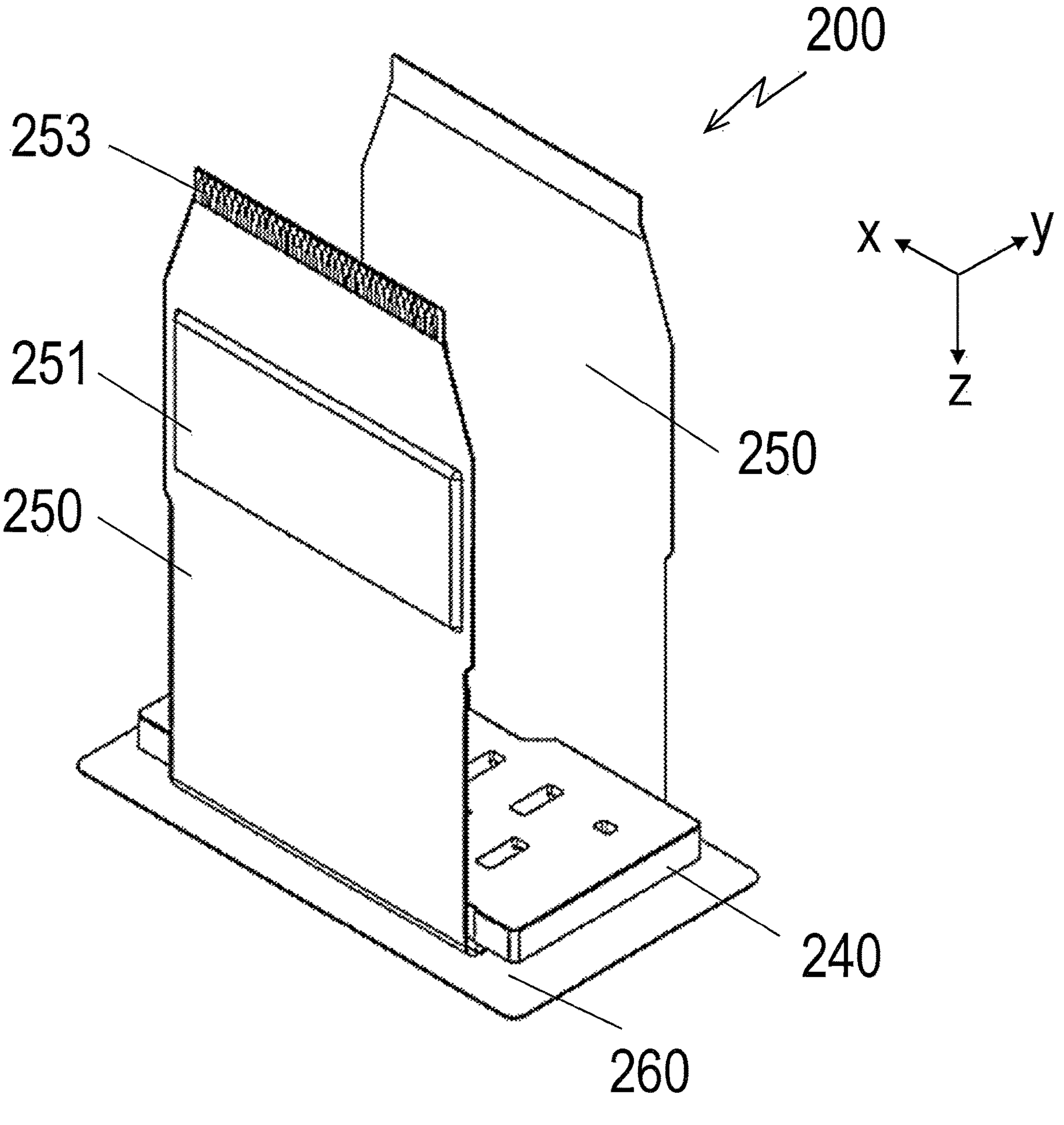
FIG. 5 is a perspective view of the liquid discharge unit of the first embodiment.
Figure 6:
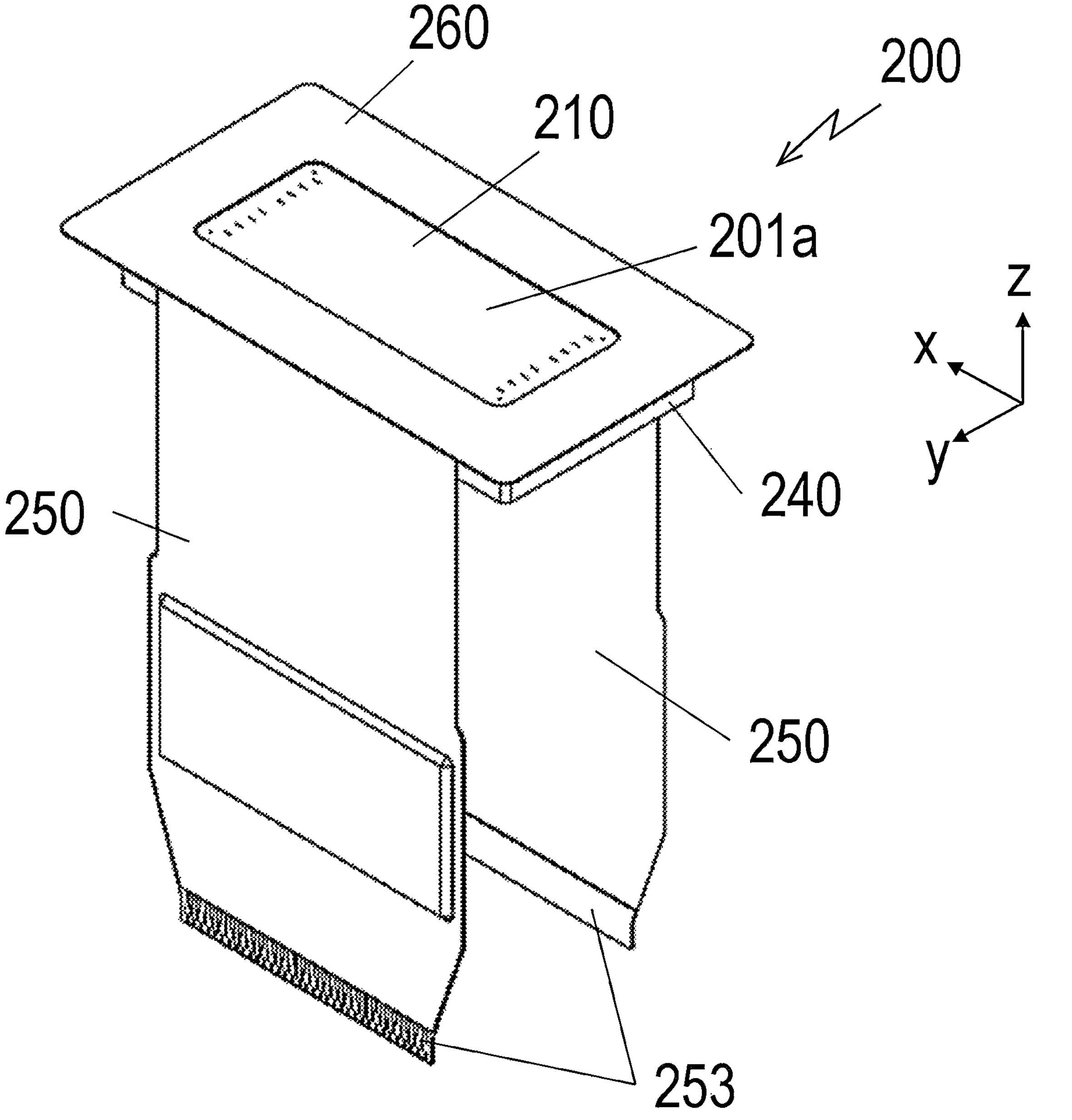
FIG. 6 is a perspective view of the liquid discharge unit of the first embodiment.
Figure 7:
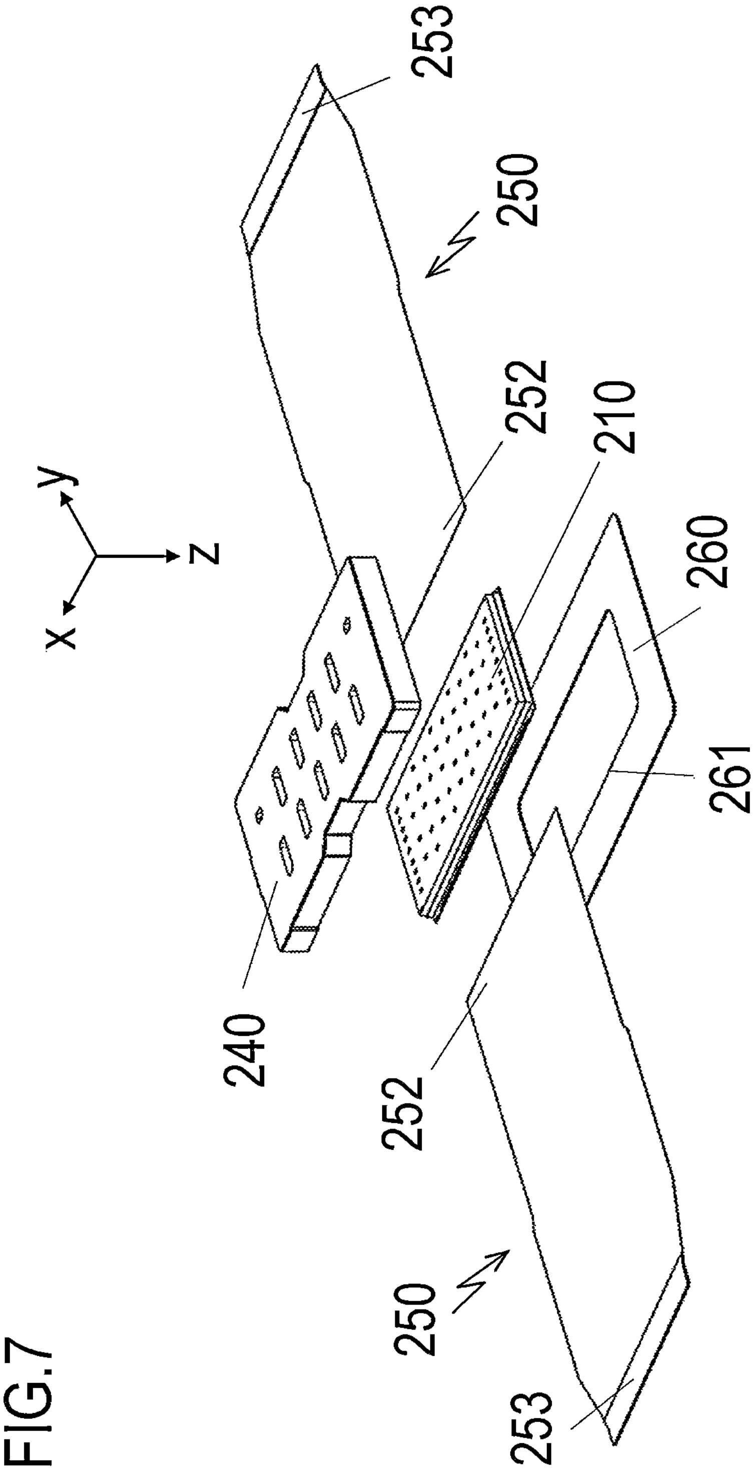
FIG. 7 is an exploded perspective view of the liquid discharge unit of the first embodiment.

Subsequently, a constitution of the liquid discharge unit 200 will be explained. FIG. 5 is a perspective view of the liquid discharge unit 200. FIG. 6 is a perspective view of the liquid discharge unit 200 viewed from the side opposite to that in FIG. 5. FIG. 7 is an exploded perspective view of the liquid discharge unit 200.

The liquid discharge unit 200 is constituted by a chip 210, which is a liquid discharge chip that discharges the liquid, a flow-passage conversion member 240, a flexible-wiring substrate 250, and the protective member 260. The flow-passage conversion member 240 is a liquid supply member that supplies the liquid to the chip 210, and a flow passage through which the liquid passes is formed inside.

The flexible-wiring substrate 250 is a connection portion electrically connected to the chip 210 and is a band-shaped member having flexibility. In the first embodiment, two pieces of the flexible-wiring substrates 250 are provided on the liquid discharge unit 200. One of the flexible-wiring substrates 250 is connected to one end part in a direction (y-axis direction) orthogonal to the alignment direction (x-axis direction) of the discharge port of the chip 210, while the other flexible-wiring substrate 250 is connected to the other end part on the side opposite to the one end part of the chip 210.

In the flexible-wiring substrate 250, a drive-circuit substrate 251 for driving a recording element of the chip 210 is provided. On one end part of the flexible-wiring substrate 250, a first electric-connection portion 252 connected to the chip 210 is provided, and on the other end part on the side opposite to the first electric-connection portion 252, a second electric-connection portion 253 connected to the electric-wiring substrate 400 via the base unit 300 is provided.

Figure 8:
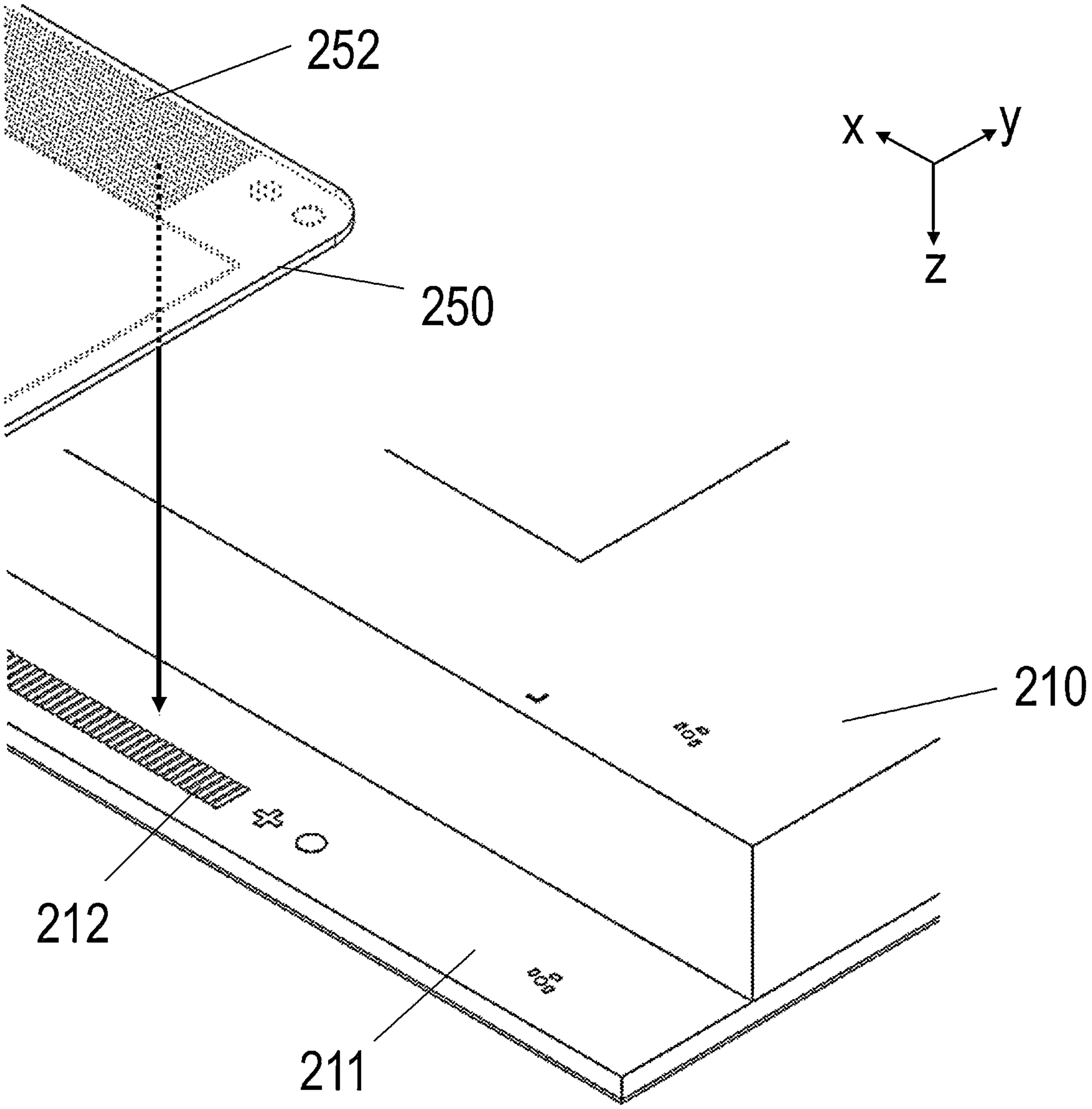
FIG. 8 is a perspective view of an electric connection portion of the liquid discharge unit of the first embodiment.

FIG. 8 is a perspective view illustrating a bonding part between the chip 210 and the flexible-wiring substrate 250. As shown in FIG. 8, on the both end parts in the y-axis direction of the chip 210, a thin plate portion 211, which is formed with a thickness smaller than that of the center part, is formed. On each of the thin plate portions 211, an electrode portion 212 electrically connected to the first electric-connection portion 252 of the flexible-wiring substrate 250 is provided. When the electrode portion 212 of the chip 210 and the first electric-connection portion 252 of the flexible-wiring substrate 250 are brought into contact with each other, the chip 210 and the flexible-wiring substrate 250 are electrically connected.

The protective member 260 is bonded to a discharge port surface 201*a* of the chip 210. The discharge port surface 201*a* is perpendicular to a discharge direction (z-axis direction) of the liquid. The protective member 260 prevents liquid intrusion into an electric connection portion between the chip 210 and the flexible-wiring substrate 250 and protects the chip 210. The protective member 260 is a thin-plate shaped member having an opening 261 for enabling discharge of the ink from the chip 210. In the first embodiment, the liquid discharge head 100 includes a plurality of the chips 210 and the protective members 260 in the same number as that of the chips 210.

To the discharge port surface 201*a* of the chip 210, water-repellant treatment for preventing fixation of ink is applied. On the other hand, the water-repellant treatment on an adhesion region between the chip 210 and the protective member 260 is preferably removed in order to improve an adhesion force by an adhesive. That is, when viewed in a direction perpendicular to the discharge port surface 201*a*, in the discharge port surface 201*a* of the chip 210, it is preferable that a region overlapping a part other than the opening 261 of the protective member 260 is water-repellant treated, while a region overlapping the protective member 260 is not water-repellant treated.

The protective member 260 preferably has a small thickness in order to narrow an interval between the discharge port surface 201*a* and the recording medium 20 so as to suppress an image kink. Specifically, the thickness of the protective member 260 is preferably 0.3 mm or less.

Moreover, an outer shape of the protective member 260 is formed larger than an outer shape of the chip 210, and an outer shape of the opening 261 is formed smaller than an outer shape of the chip. In other words, an x-direction width of the chip 210 is smaller than the x-direction width of the protective member 260 and larger than the x-direction width of the opening 261. Moreover, a y-direction width of the chip 210 is smaller than the y-direction width of the protective member 260 and is larger than the y-direction width of the opening 261. By means of the configuration as above, when viewed in the z-direction, an outer-peripheral edge part of the chip 210 overlaps the protective member 260, and the chip 210 is protected by the protective member 260 more reliably.

Configuration of Liquid Discharge Chip

Figure 9A:
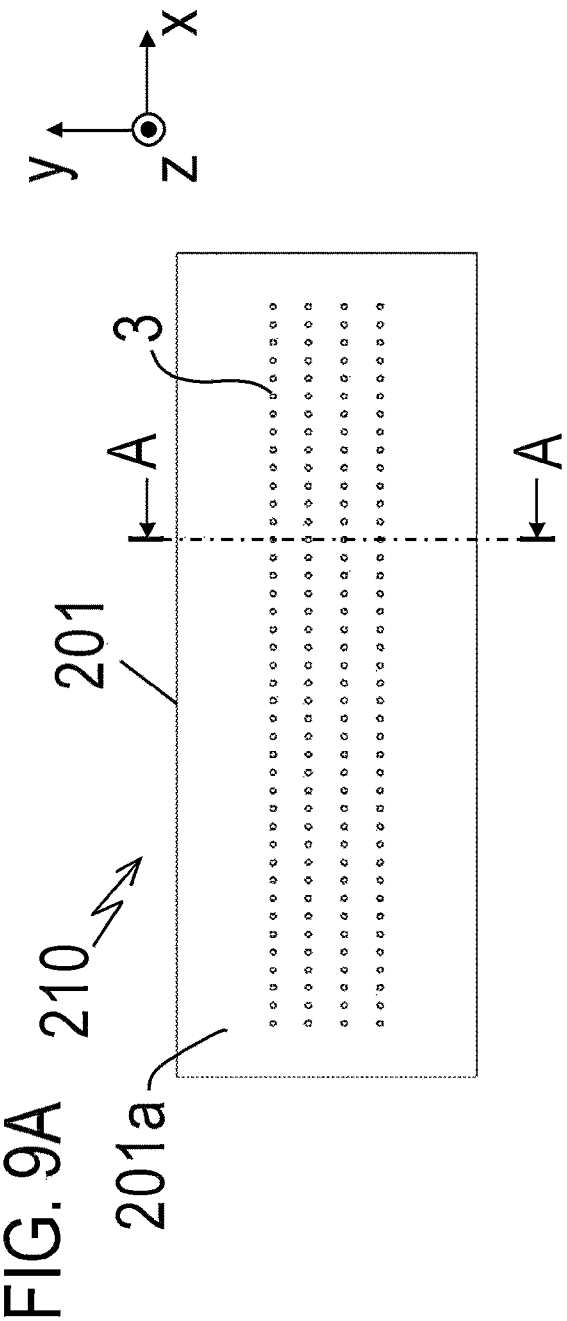
FIGS. 9A and 9B are explanatory diagrams of a liquid discharge chip of the first embodiment.
Figure 9B:
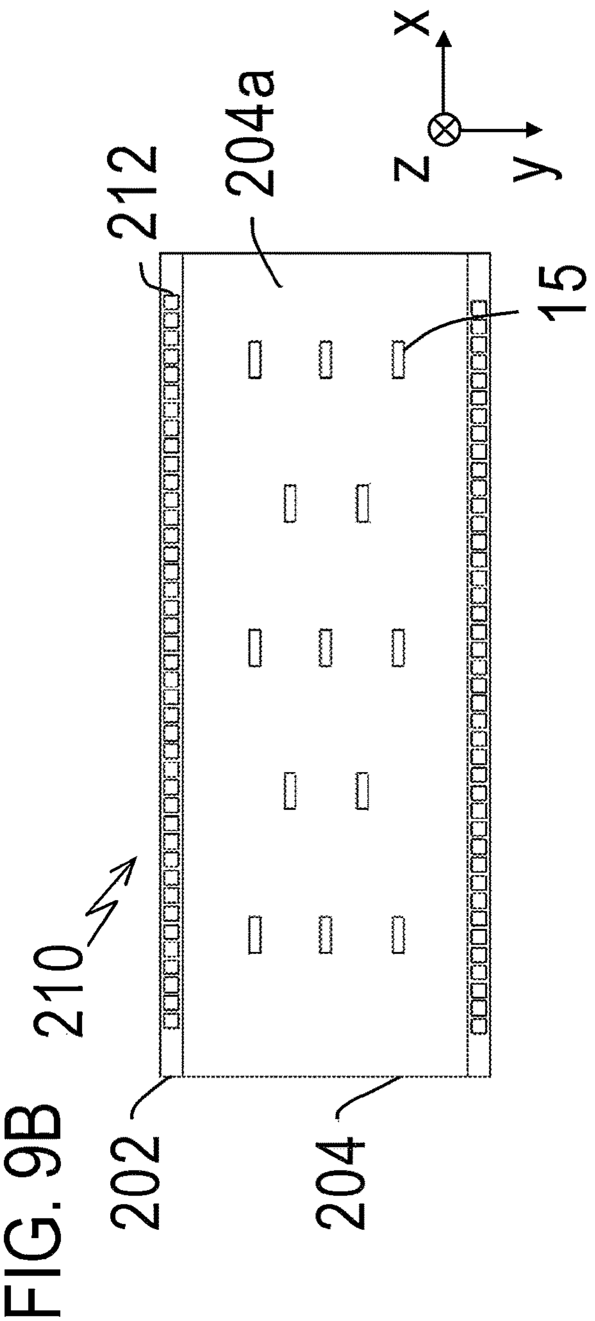

Subsequently, a configuration of the chip 210, which is a liquid discharge chip, will be explained. FIGS. 9A and 9B are diagrams illustrating a structure of the chip 210. FIG. 9A is a plan view when the chip 210 is viewed in a direction perpendicular to the discharge port surface 201*a* from the discharge port surface 201*a* side. FIG. 9B is a view when the chip 210 is viewed in a direction perpendicular to a surface 204*a* from the surface 204*a* side opposite to the side of the discharge port surface 201*a*.

As shown in FIG. 9A, the discharge port surface 201*a* is a surface in which a plurality of discharge ports 3 that discharge a liquid such as ink are formed and is a surface of a nozzle substrate 201. The discharge port surface 201*a* faces a discharge direction of the liquid. On the nozzle substrate 201, a plurality of the discharge ports 3 are aligned along a longitudinal direction (x-axis direction) of the nozzle substrate 201 and constitute a discharge port row. In the first embodiment, the chip 210 has a plurality of the discharge port rows, and the plurality of discharge port rows are provided in parallel in the y-axis direction. Though FIG. 9A illustrates four discharge port rows, the number of the discharge port rows is not limited to that.

The chip 210 is constituted such that a plurality of the substrates are laminated on the nozzle substrate 201. On the nozzle substrate 201, a liquid-chamber substrate 202 and a flow-passage forming substrate 204 are laminated, for example. In the chip 210, the surface 204*a* facing the side opposite to the discharge port surface 201*a* is formed by the flow-passage forming substrates 204 laminated on the nozzle substrate 201.

In the flow-passage forming substrate 204, a plurality of connection flow-passages 15 for supplying and recovering the liquid with respect to the chip 210 are formed. One end of a connection flow-passage 15 is opened in the surface 204*a* of the flow-passage forming substrate 204. The connection flow-passage 15 communicates with the liquid connection portion 501 via the liquid supply unit 500. Moreover, the liquid connection portion 501 is connected to a liquid accommodation portion such as an ink tank, not shown. As a result, the liquid accommodated in the liquid accommodation portion is supplied into the chip 210 via the liquid connection portion 501 and the connection flow-passage 15.

The liquid-chamber substrate 202 is formed larger than the flow-passage forming substrate 204 in the y-direction, and when viewed in the z-direction, the electrode portion 212 is provided at a part not overlapping the flow-passage forming substrate 204 of the liquid-chamber substrate 202. By means of the configuration as above, the electrode portion 212 is exposed on the surface facing the side opposite to the discharge port surface 201*a* and is connected to the flexible wiring substrate 250.

Internal Structure of Liquid Discharge Chip

Figure 10A:
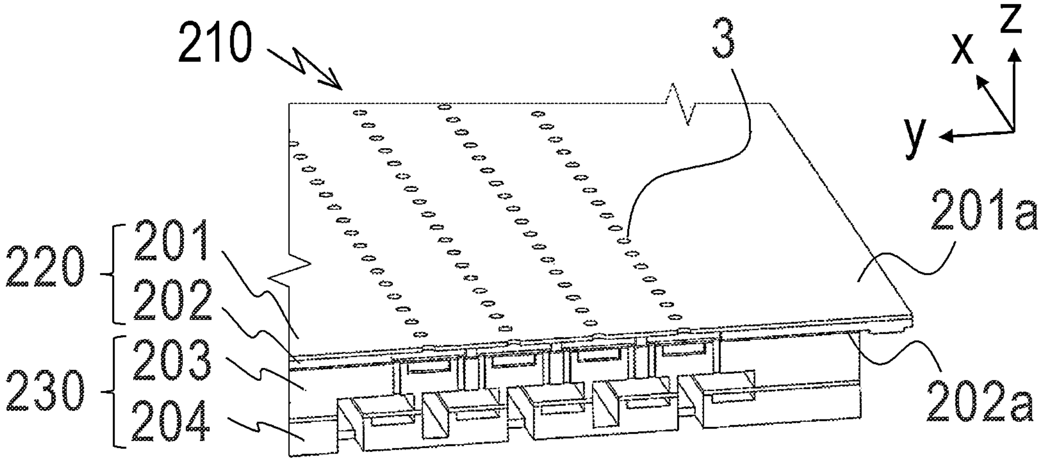
FIGS. 10A and 10B are explanatory diagrams of an internal structure of the liquid discharge chip of the first embodiment.
Figure 10B:
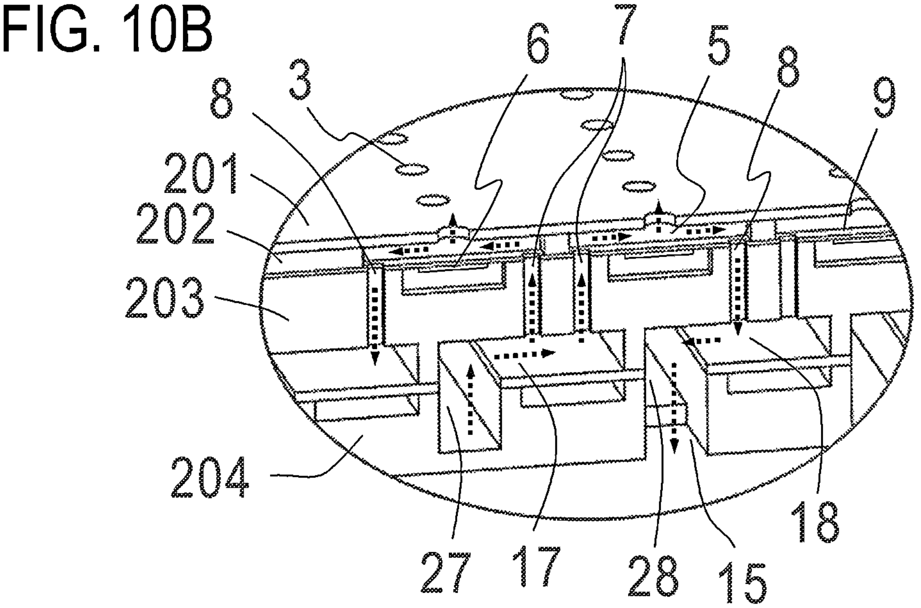

FIGS. 10A and 10B are explanatory views illustrating an internal structure of the chip 210. FIG. 10A is a sectional perspective view illustrating a part of a section of the chip 210 cut down along an A-A line in FIG. 9A, and FIG. 10B is a partially enlarged view of FIG. 10A. The chip 210 has such a structure, as shown in FIG. 10A, that the nozzle substrate 201, the liquid-chamber substrate 202, a liquid-supply substrate 203, and the flow-passage forming substrate 204 are laminated sequentially. In the first embodiment, a first substrate 220 is constituted by laminated substrates including the nozzle substrate 201 and the liquid-chamber substrate 202, and a second substrate 230 is constituted by laminated substrates including the liquid-supply substrate 203 and the flow-passage forming substrate 204.

Between the nozzle substrate 201 in which the plurality of discharge ports 3 are formed and the liquid-chamber substrate 202 bonded to the nozzle substrate 201, a liquid chamber 5 provided correspondingly to each of the plurality of discharge ports 3 is formed. Each of the liquid chambers 5 constitutes a part of a flow passage communicating with the corresponding discharge port 3, respectively. In each of the plurality of liquid chambers 5, a vibration plate 9 constituting a part of the liquid-chamber substrate 202 is provided. The vibration plate 9 is provided capable of deformation by vibration and constitutes a wall surface of the liquid chamber 5.

A flow passage of the first substrate 220 is preferably a thinned flow passage with a dimension in an ink discharge direction (z-axis direction) (hereinafter, noted as a thickness) is 0.3 mm (300 μm) or less in order to exert a high discharging performance and circulation performance. The flow passage of the first substrate 220 of the first embodiment is formed by the nozzle substrate 201 and the liquid-chamber substrate 202. Thus, a total thickness of the nozzle substrate 201 and the liquid-chamber substrate 202 by which this flow passage is formed, that is, the thickness of the first substrate 220 is preferably 0.3 mm or less.

The chip 210 includes a plurality of energy generating elements 6, and the energy generating element 6 is provided on the respective vibration plates 9. That is, in the plurality of liquid chambers 5, the energy generating elements 6 corresponding to each of them are provided. The energy generating element 6 can pressurize the ink in the liquid chamber 5 by deforming the vibration plate 9 and discharge the ink from the discharge port 3.

The first substrate 220 constituted by the nozzle substrate 201 and the liquid-chamber substrate 202 has the discharge port surface 201*a* and a bonding surface 202*a* facing a direction opposite to the discharge port surface 201*a*. The discharge port surface 201*a* is a surface of the nozzle substrate 201 in which the plurality of discharge ports 3 are formed and is opposed to the recording medium 20 in a recording operation. The bonding surface 202*a* is a surface of the liquid-chamber substrate 202. The liquid-chamber substrate 202 is bonded to the liquid-supply substrate 203 on the bonding surface 202*a* and is bonded to the nozzle substrate 201 on the surface on the side opposite to the bonding surface 202*a*.

In the liquid-supply substrate 203, a plurality of individual supply flow-passages 7 and a plurality of individual recovery flow-passages 8 communicating with each of the plurality of liquid chambers 5 are formed. A part of the liquid supplied from an individual supply flow-passage 7 to the liquid chamber 5 is discharged from the discharge port 3 by driving of the energy generating element 6. On the other hand, the liquid supplied to the liquid chamber 5 but not discharged from the discharge port 3 flows to the individual recovery flow-passage 8. Moreover, when the energy generating element 6 is not driven, all the liquid supplied into the liquid chamber 5 flows to the individual recovery flow-passage 8.

The second substrate 230 constituted by the liquid-supply substrate 203 and the flow-passage forming substrate 204 has flow passages such as the connection flow-passage 15, a common supply communication-path 17, a common supply flow-passage 27, a common recovery communication-path 18, a common recovery flow-passage 28 and the like. The common supply flow-passage 27 and the common recovery flow-passage 28 extend long in the discharge-port row direction of the discharge port 3 and are connected to the connection flow-passage 15. The common supply communication-path 17 is a connection flow-passage for connecting the common supply flow-passage 27 and the individual supply flow-passage 7. The common recovery communication-path 18 is a connection flow-passage for connecting the common recovery flow-passage 28 and the individual recovery flow-passage 8. In other words, the supply flow-passage of the second substrate 230 which supplies the liquid to the discharge port 3 (liquid chamber 5) is constituted by the individual supply flow-passage 7, the common supply communication-path 17, and the common supply flow-passage 27. Moreover, a recovery flow-passage of the second substrate 230 which recovers the liquid from the liquid chamber 5 is constituted by the individual recovery flow-passage 8, the common recovery communication-path 18, and the common recovery flow-passage 28.

The nozzle substrate 201, the liquid-chamber substrate 202, the liquid-supply substrate 203, and the flow-passage forming substrate 204 can be formed by a silicon substrate and the like, respectively. Moreover, in the first embodiment, each of these substrates is formed by the individual substrates, but this is not limiting, but each of the substrates can be integrally formed. Specifically, for example, the first substrate 220 may be constituted by a single substrate, and the second substrate 230 may be formed by a single substrate.

In FIG. 10B, a flow of the liquid inside the chip 210 is indicated by an arrow. The liquid flowing into the common supply flow-passage 27 from the ink tank outside via the connection flow-passage 15 flows into the individual supply flow-passage 7 via the common supply communication-path 17 and is supplied to the liquid chamber 5. The liquid supplied to the liquid chamber 5 is partially discharged from the discharge port 3 by the driving of the energy generating element 6, while the remaining liquid flows into the individual recovery flow-passage 8. Moreover, when the energy generating element 6 is not driven, all the liquid supplied to the liquid chamber 5 flows into the individual recovery flow-passage 8. The ink having flown into the individual recovery flow-passage 8 flows into the common recovery flow-passage 28 via the common recovery communication-path 18 and then, is recovered into the ink tank outside via the connection flow-passage 15. As described above, the liquid discharge head 100 according to the first embodiment has such a constitution that the liquid flows capable of circulation.

Manufacturing Method of Liquid Discharge Head

Figure 11:
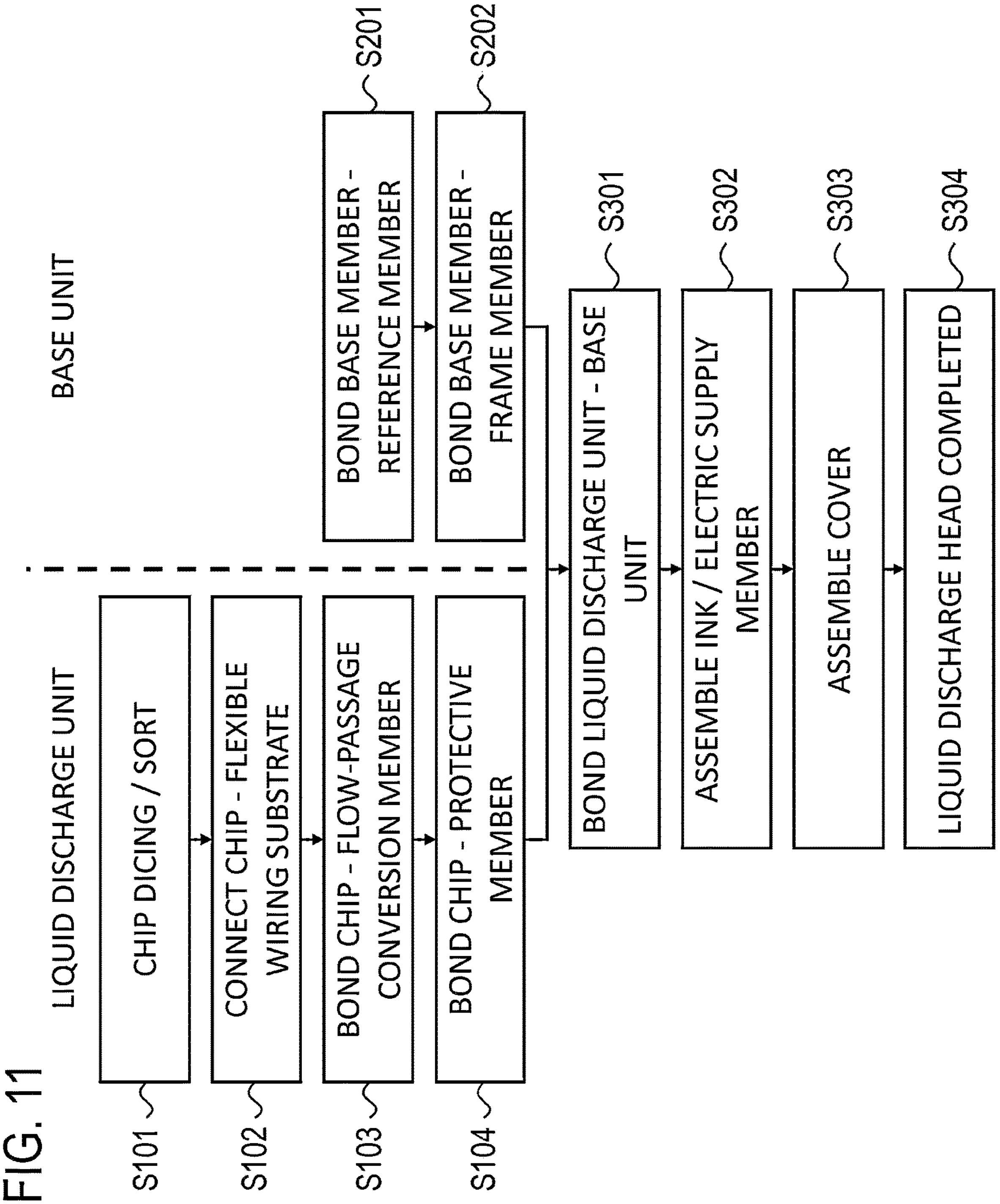
FIG. 11 is a flowchart of a manufacturing method of the liquid discharge head of the first embodiment.

Subsequently, a manufacturing method of the liquid discharge head 100 according to the first embodiment will be explained. FIG. 11 is an explanatory view of a manufacturing process of the liquid discharge head 100. Note that the manufacturing process shown in FIG. 11 is only an example of the manufacturing process of the liquid discharge head 100, and the manufacturing process of the liquid discharge head 100 is not necessarily limited to this.

The liquid discharge head 100 of the first embodiment is manufactured through a process of individually assembling the liquid discharge unit 200 and the base unit 300, respectively, and then, of bonding them to each other, and by assembling the other interior/exterior equipment thereto.

Firstly, a manufacturing process of the liquid discharge unit 200 will be explained. First, the chip 210 is diced (cut down) from a silicon wafer and sorted (organized), whereby they are individualized (S101). The silicon wafer is formed by laminating various functional layers constituting the first substrate 220 and the second substrate 230.

To the individualized chip 210, first, two pieces of the flexible-wiring substrates 250 are connected (S102). In a connection process of the chip 210 and the flexible-wiring substrate 250, the electrode portion 212 of the chip 210 and the first electric-connection portion 252 of the flexible-wiring substrate 250 are connected.

Subsequently, a bonding process of bonding the flow-passage conversion member 240 to the chip 210 is performed (S103). The flow-passage conversion member 240 is bonded to the surface 204*a* in which the connection flow-passage 15 of the chip 210 is opened.

Subsequently, a bonding process of bonding the protective member 260 to the chip 210 is performed (S104). The protective member 260 is bonded to the discharge port surface 201*a* in which the discharge port 3 of the chip 210 is opened. Detail of the bonding process of the chip 210 and the protective member 260 will be described later. Through the processes as above, the liquid discharge unit 200 is completed.

Subsequently, the manufacturing process of the base unit 300 will be explained. First, three pieces of the reference members 340 are bonded to the base member 310 (S201).

The reference member 340 is bonded to a surface facing a direction opposite to the discharge direction of the liquid of the base member 310.

Subsequently, the frame member 320 is bonded to the base member 310 (S202). The frame member 320 is bonded to a surface facing the discharge direction of the liquid of the base member 310. Through these processes, the base unit 300 is completed.

Subsequently, the liquid discharge unit 200 and the base unit 300 completed through each of the aforementioned processes are bonded to each other (S301). At this time, the protective member 260 and the base member 310 are bonded to each other. And to the liquid discharge unit 200 and the base unit 300, various electric supply portions and liquid supply portions such as the electric-wiring substrate 400, the liquid supply unit 500 or the like are assembled (S302). Lastly, cover members such as the cover 420 and the electric-connection portion cover 430 are assembled (S303), and the liquid discharge head 100 is completed (S304).

Bonding Method of Chip and Protective Member

Figures 12A, 12B, 12C:
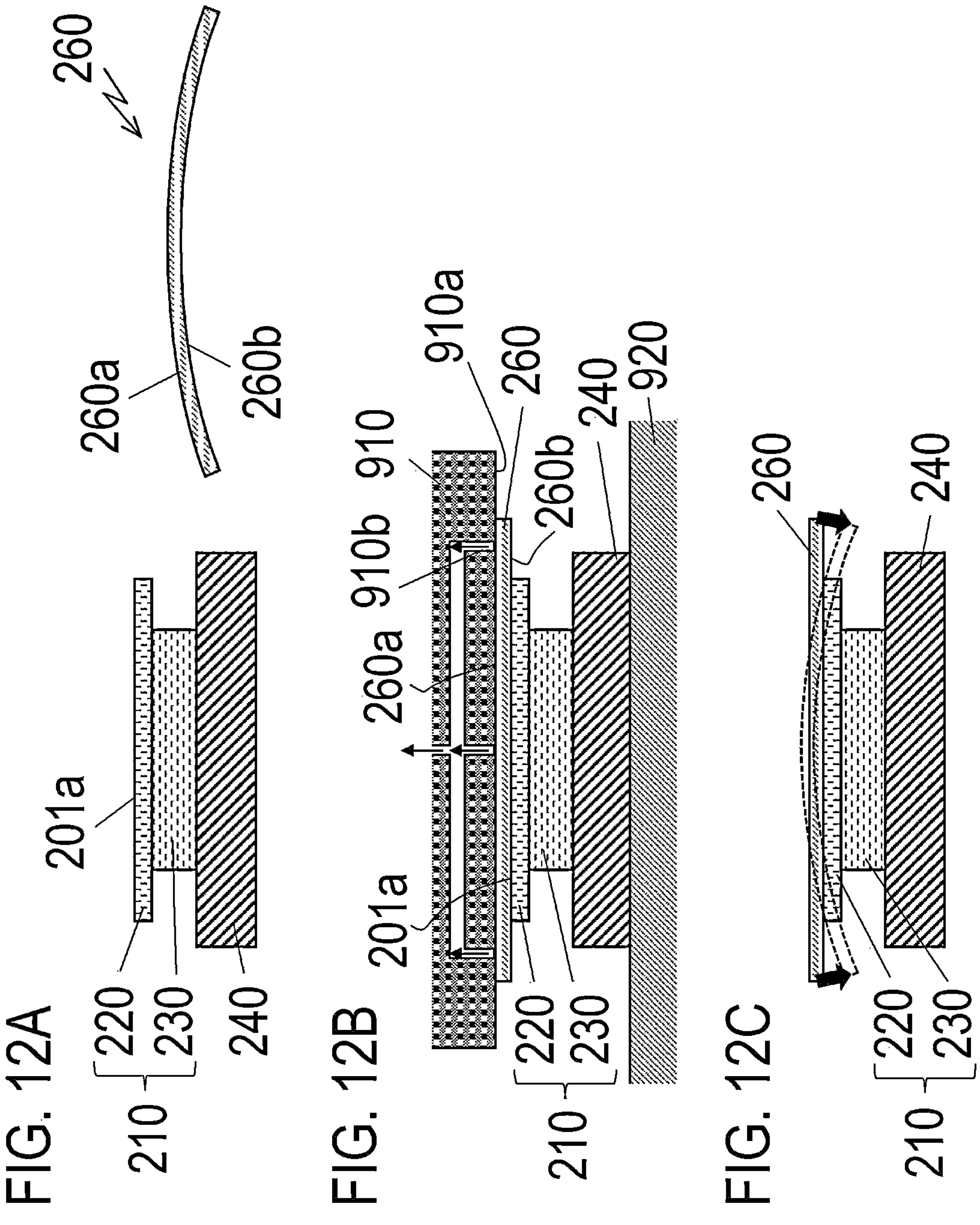
FIGS. 12A to 12C are explanatory diagrams of a bonding method of the liquid discharge chip and a protective member of the first embodiment.
Figure 13:
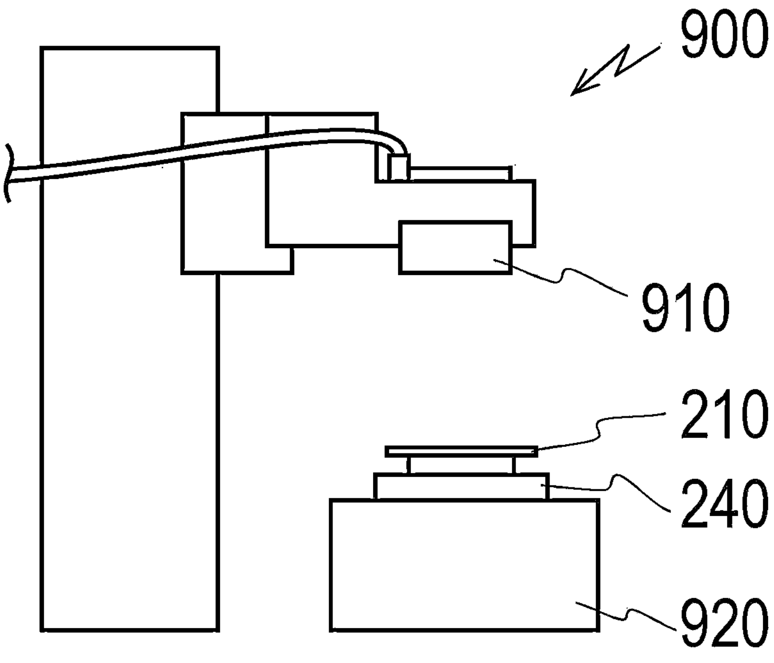
FIG. 13 is a schematic diagram of a bonding device of the first embodiment.

Subsequently, the bonding method of the chip 210 and the protective member 260 will be explained in more detail. FIGS. 12A to 12C are explanatory diagrams of the bonding method of the chip 210 and the protective member 260, and sectional views of the chip 210 and the protective member 260. FIGS. 12A to 12C are diagrams of the protective member 260 viewed on a section not passing through the opening 261. FIG. 13 is a schematic diagram of a bonding device 900 used for the bonding of the chip 210 and the protective member 260. The bonding of the chip 210 and the protective member 260 is performed by the bonding device 900 including a movable adsorption finger 910 and a holding portion 920 for holding the chip 210.

FIG. 12A illustrates a state in which the chip 210 and the protective member 260 before the bonding. In a state before being bonded to the chip 210, the protective member 260, which is a plate member made of metal, is formed in a considerably warped state in general. FIG. 12A illustrates the protective member 260 in the state before being bonded to the chip 210, which is the protective member 260 having such a warp that a center part of a first surface 260*a* becomes convex. As a material of the protective member 260, a coil around which a thin metal plate is wound is used in general by considering manufacturing performances, prices and the like, and in such a case, it is particularly difficult to suppress the warp of the protective member 260 before the bonding. Thus, the bonding of the chip 210 and the protective member 260 is performed in a state where the first surface 260*a* of the protective member 260 is made flat by the adsorption finger 910.

When the protective member 260 which is warped from the beginning is made flat and bonded to the chip 210, a spring stress to return to the warped state acts on the protective member 260. That is because the protective member 260 is a thin-plate state metal member and springs back. When the spring stress acts in a direction for separating end parts of the bonding portion of the protective member 260 and the chip 210, there is a concern that separation between the protective member 260 and the chip 210 or separation between the first substrate 220 of the chip 210 and the second substrate 230 is caused. Thus, in the first embodiment, in order to prevent the spring stress of the protective member 260 from becoming a cause of the separation between each of the members, the protective member 260 and the chip 210 are bonded by considering the warping direction of the protective member 260.

FIG. 12B illustrates a state in which the protective member 260 is bonded to the chip 210 by the bonding device 900. The chip 210 is held by the holding portion 920 of the bonding device 900 so that the discharge port surface 201*a* faces upward in the state where the flow-passage conversion member 240 is bonded.

In the adsorption finger 910, an adsorption surface 910*a*, which is a flat surface to which a surface of the protective member 260 facing a side opposite to the bonding surface with the chip 210 is adsorbed, and a plurality of intake paths 910*b* opened in the adsorption surface 910*a* are provided. In FIG. 12B, a flow-passage direction of air in the intake path 910*b* at the adsorption of the protective member 260 is indicated by an arrow.

At the time of bonding of the chip 210 and the protective member 260, the protective member 260 is held by the adsorption finger 910 in a flat state following the adsorption surface 910*a* so that the entire surface of the protective member 260 facing the side opposite to the bonding surface with the chip 210 is in contact with the adsorption surface 910*a*. And by means of the adsorption finger 910, the protective member 260 is positioned with respect to the chip 210 and then, bonded. In the first embodiment, the chip 210 and the protective member 260 are bonded to each other by an adhesive applied in advance.

In the first embodiment, it is configured such that the adsorption finger 910 holds the protective member 260 by considering the direction of the warp of the protective member 260. Specifically, the adsorption finger 910 holds the protective member 260 so that the first surface 260*a* of the protective member 260 in the warped state in which the center part of the first surface 260*a* before the bonding becomes convex is in contact with the adsorption surface 910*a*. And a second surface 260*b* facing a side opposite to the first surface 260*a* of the protective member 260 is bonded to the discharge port surface 201*a* of the chip 210. Here, the first surface 260*a* of the protective member 260 is the surface facing upward when being placed so that the center part of the warped protective member 260 before the bonding is convex upward, and the second surface 260*b* is the surface facing downward (placed surface side). In other words, the protective member 260 in the warped state so as to become convex upward has its upper surface held by the adsorption finger 910 and its lower surface bonded to the chip 210.

FIG. 12C illustrates a state where the chip 210 and the protective member 260 are bonded together. When the adhesive is hardened, the adsorption of the adsorption finger 910 is released, and the adsorption finger 910 is separated from the protective member 260. Then, the spring reaction force to return to the warped state before the bonding is generated in the protective member 260.

FIG. 12C indicates a shape of the protective member 260 in the warped state before the bonding by a dotted line, and a direction of the spring reaction force acting on the protective member 260 is indicated by an arrow. In the first embodiment, since the second surface 260*b* of the protective member 260 in the warped state is the bonding surface with the chip 210, the spring reaction force acts in the direction in which the end part of the protective member 260 is pressed onto the chip 210. That is, the reaction force of the protective member 260 acts in the direction of pressing the end part of the bonding portion of the protective member 260 and the chip 210 and the end part of the bonding portion of the first substrate 220 and the second substrate 230 of the chip 210 and suppresses the separation among each of the members of the liquid discharge unit 200. By means of the configuration as above, in the first embodiment, breakage of the liquid discharge head 100 caused by the warp derived from the material of the protective member 260 is suppressed.

Manufacturing Method of Protective Member

Figure 14A:
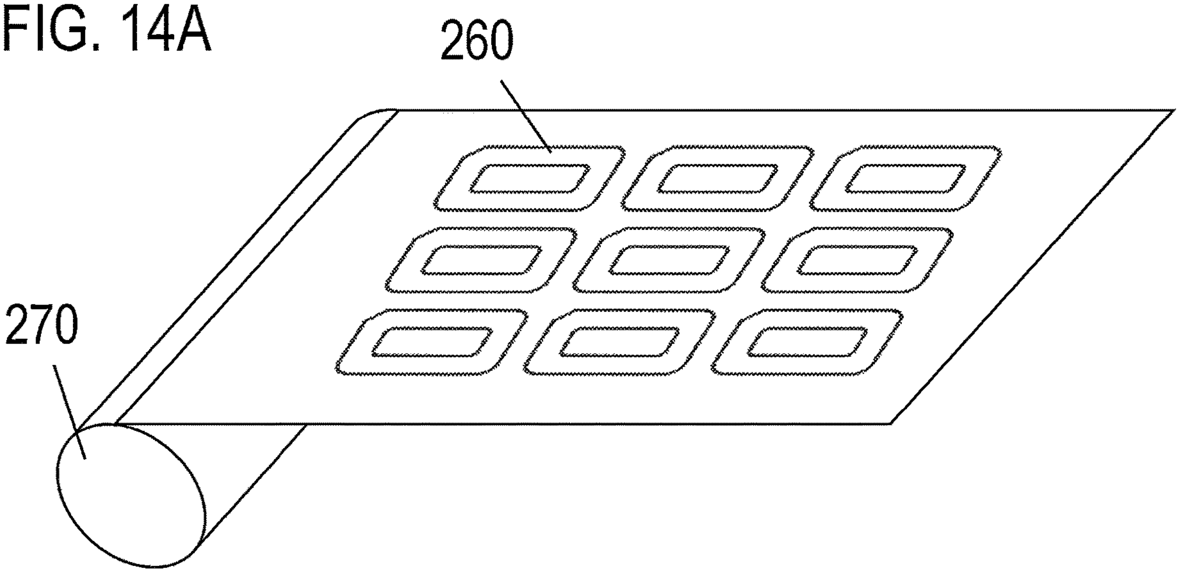
FIGS. 14A and 14B are explanatory diagrams of the protective member of the first embodiment.
Figure 14B:
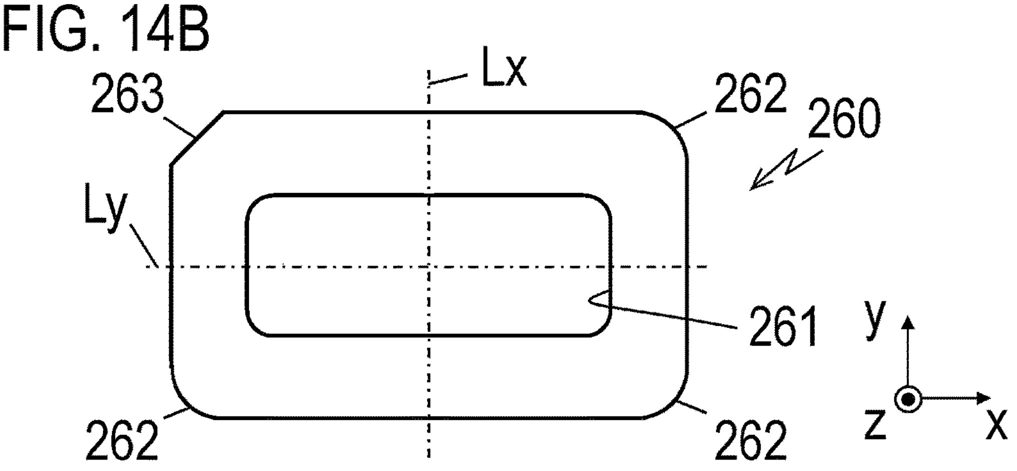

Subsequently, a protective-member forming process for manufacturing the protective member 260 will be explained in detail. FIG. 14A is an explanatory diagram of the manufacturing method of the protective member 260. FIG. 14B is a plan view of the protective member 260 when viewed in the z-axis direction. In the first embodiment, the protective member 260 is individualized from a coil material 270 and formed. The protective-member forming process as above is performed before the bonding process of bonding the protective member 260 to the chip 210. As a method of the individualization, publicly-known machining methods such as etching, laser machining, wire discharge-machining, pressing and the like can be used, and it is not limited to one method. The coil material 270 has a convex warp on an outer side in a winding direction, and the protective member 260 individualized from the coil material 270 also has the warp in the same direction as that of the coil material 270.

The protective member 260 in the first embodiment is a thin-plate shaped member as described above and has a substantially rectangular shape. The opening 261 is provided at the center part of the protective member 260, and among four corners on an outer peripheral part, only one corner is formed with a shape different from those of the other three corners. Specifically, when the protective member 260 is viewed from the z-axis direction (direction orthogonal to an in-plane direction), the three corners of the four corners of the protective member 260 are arc portions 262, each having an arc shape (R-shape), while the other one corner is a chamfered portion 263 having a chamfered shape (C-shape). That is, the protective member 260 has a shape asymmetrical to a center line Lx in the x-axis direction and asymmetrical to a center line Ly in the y-axis direction. Note that the center line Lx in the x-axis direction is a line passing in the middle of one end and the other end in the x-axis direction of the protective member 260 and extending in the y-axis direction. Similarly, the center line Ly in the y-axis direction is a line passing in the middle of one end and the other end in the y-axis direction of the protective member 260 and extending in the x-axis direction.

By means of the configuration as above, the four corners of the protective member 260 function as an identification portion for identifying the warping direction of the protective member 260, whereby visual front-rear control (external/internal control of the coil material 270 before individualization) of the protective member 260 before bonding is made possible. In other words, the identification portion having a shape asymmetrical to the center line Lx in the x-axis direction and asymmetrical to the center line Ly in the y-axis direction is provided in the protective member 260 and thus, the warping direction control of the protective member 260 is made possible. In the first embodiment, in a case where the chamfered portion 263 is located upper left or lower right when the protective member 260 is viewed from above, the center part in the longitudinal direction (x-axis direction) is brought into a state of being convex upward,. That is, the control of the warping direction of the protective member 260 is made easy, and the protective member 260 can be installed on the bonding device 900 or the like with a correct direction and thus, a manufacturing performance of the liquid discharge head 100 having a favorable structural reliability is improved.

Note that, in the first embodiment, the corners of the protective member 260 are formed with an arc shape or a chamfered shape, but such configuration is not limiting. For example, all the four corners may be formed with curved-surface shapes with different radiuses. Alternatively, after the four corners are formed with the same shape, a hole may be formed in the vicinity of one corner. That is, in order to bond the protective member 260 by considering the warping direction, it is only necessary that the protective member 260 has an asymmetrical shape to the center line Lx and the center line Ly so that the front-rear control of the protective member 260 can be executed visually.

Second Embodiment

Subsequently, a second embodiment according to the present invention will be explained. In the following explanation, configurations in the second embodiment similar to those in the first embodiment are given the same signs, and the explanation thereof is omitted, while a featured parts of the second embodiment will be mainly explained. The second embodiment is different from the first embodiment in a shape of the protective member 260.

Figure 15:
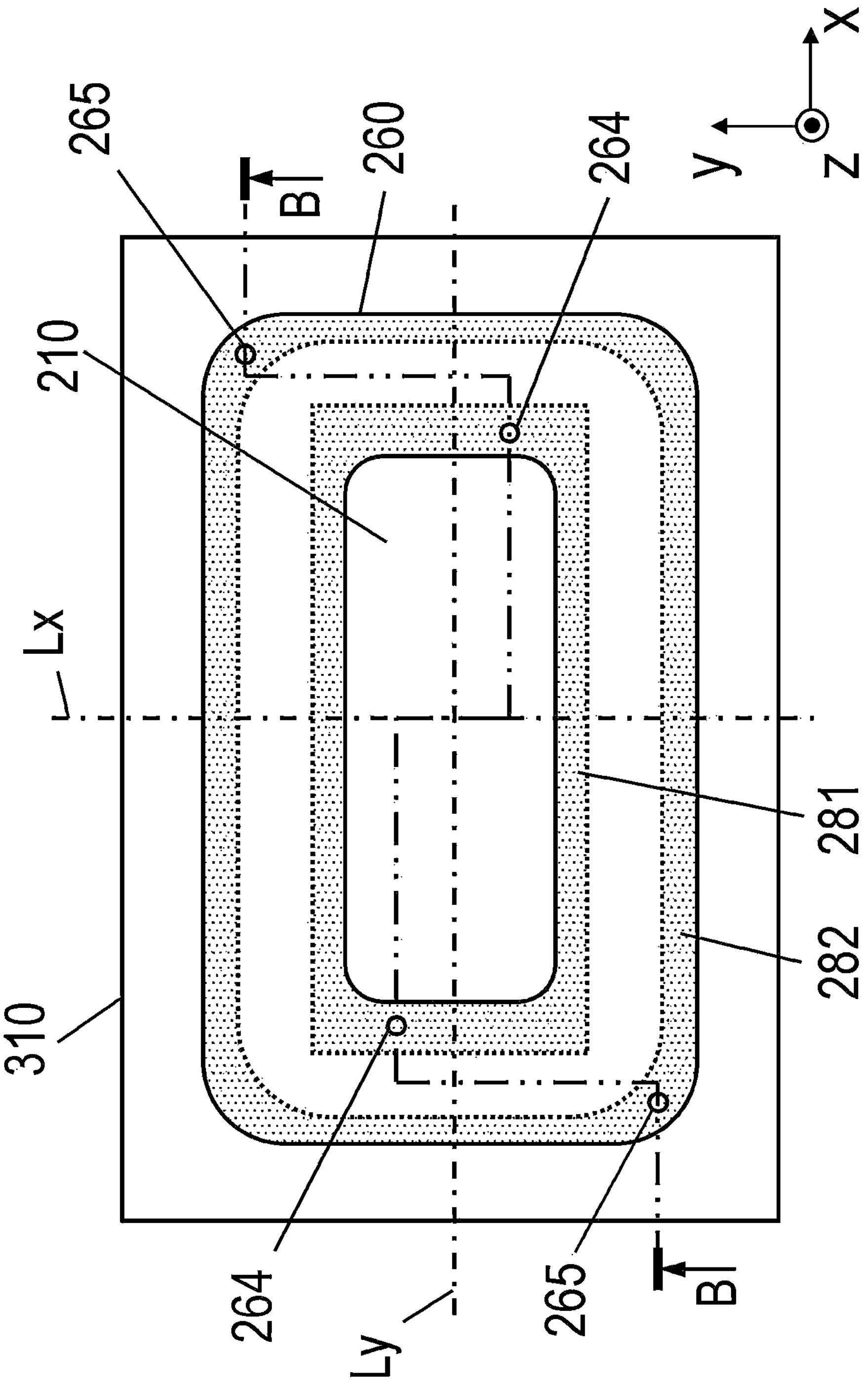
FIG. 15 is a schematic front view of a liquid discharge head of a second embodiment.

FIG. 15 is a schematic front view of the liquid discharge head 100 according to the second embodiment viewed in a direction opposite to the discharge direction of the liquid. In FIG. 15, illustration of the members other than the main members is omitted for simplification, and an inner-side adhesion region 281 and an outer-side adhesion region 282 for bonding the protective member 260 and the chip 210 are indicated by dots.

In the protective member 260 according to the second embodiment, two pieces of inner-side hole portions 264 and two pieces of outer-side hole portions 265 are provided, and four corners are formed in the same shape. The inner-side hole portions 264 as a first hole and a second hole and the outer-side hole portions 265 as a third hole and a fourth hole are formed by penetrating in the discharge direction (z-axis direction) of the liquid. The inner-side hole portions 264 are provided at positions overlapping the inner-side adhesion region 281, which is an adhesion region of the protective member 260 and the chip 210, when viewed in the z-axis direction. Moreover, the outer-side hole portions 265 are provided at positions overlapping the outer-side adhesion region 282, which is an adhesion region of the protective member 260 and the frame member 320, when viewed in the z-axis direction.

In the second embodiment, the inner-side hole portion 264 as the first hole and the inner-side hole portion 264 as the second hole are disposed at asymmetrical positions with respect to the center line Lx and the center line Ly. Moreover, the inner-side hole portion 264 as the first hole is disposed at an asymmetrical position to the center line Lx and the center line Ly with respect to the outer-side hole portion 265 as the third hole and the outer-side hole portion 265 as the fourth hole. That is, the inner-side hole portion 264 and the outer-side hole portion 265 are disposed so that the protective member 260 has an asymmetrical shape to the center line Lx in the x-axis direction and an asymmetrical shape to the center line Ly in the y-axis direction when the protective member 260 is viewed in the z-axis direction.

Since the plurality of holes are formed so that the protective member 260 has an asymmetrical shape to the center line Lx and the center line Ly, in the second embodiment, too, the visual front-rear control (external/internal control of the coil material 270 before individualization) of the protective member 260 before the bonding is made possible.

That is, in the second embodiment, too, the control of the warping direction of the protective member 260 is facilitated, and the protective member 260 can be installed on the bonding device 900 and the like with the correct direction and thus, a manufacturing performance of the liquid discharge head 100 having favorable structural reliability is improved.

Note that, the positions and the numbers of the hole portions shown in FIG. 15 are only examples, and these configurations are not limiting. For example, by increasing/decreasing the number of holes or by changing the hole diameter of each hole, the protective member 260 may have an asymmetrical shape with respect to the center line Lx and the center line Ly. Alternatively, a mark or print may be given on one surface of the protective member 260 as an identification portion for identifying the warping direction.

Figure 16:
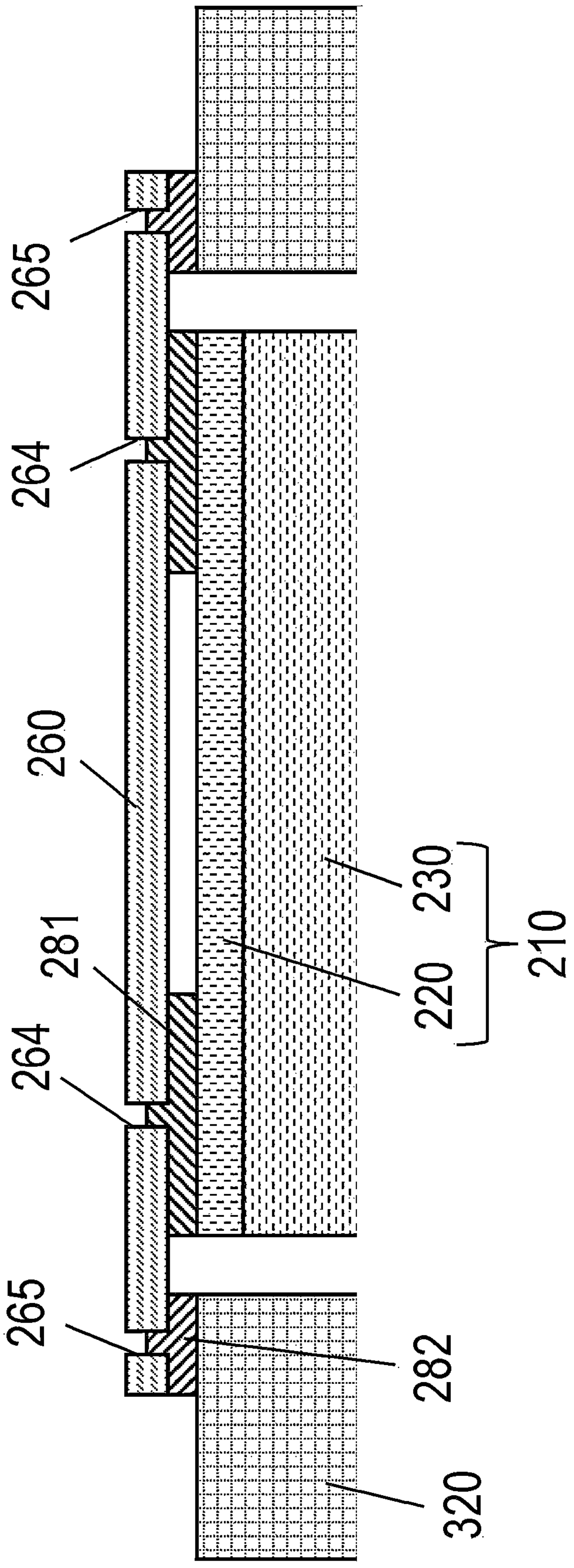
FIG. 16 is a schematic sectional diagram of a liquid discharge head of the second embodiment.

FIG. 16 is a schematic sectional diagram illustrating a section of the liquid discharge head 100 cut down along a B-B line in FIG. 15. An opposed surface adjacent to the discharge port surface 201*a* of the chip 210 is disposed so as to be opposed to the frame member 320 with an interval. And the protective member 260 is bonded by an adhesive to each of the chip 210 and the frame member 320.

A region where the adhesive interposed between the protective member 260 and the chip 210 is located is the aforementioned inner-side adhesion region 281, and a region where the adhesive interposed between the protective member 260 and the frame member 320 is the aforementioned outer-side adhesion region 282. When viewed in the z-direction, the inner-side hole portions 264 overlap the inner-side adhesion region 281, and the adhesive enters the inside of the inner-side hole portion 264 from the chip 210 side. Similarly, when viewed in the z-direction, the outer-side hole portions 265 overlaps the outer-side adhesion region 282, and the adhesive enters the inside of the outer-side hole portion 265 from the frame member 320 side. As described above, an anchor effect is generated by entering of the adhesive into the hole portions, the liquid discharge head 100 of the second embodiment has resistance against an external force received by the liquid discharge head 100 from jamming or wiping of the recording medium 20 improved. That is, the hole portions of the protective member 260 according to the second embodiment function not only as a mark for the front-rear control of the protective member 260 but also as a reinforcing portion for reinforcing the liquid discharge head 100 together with the adhesive.

Note that, in the aforementioned embodiment, the front-rear control of the protective member 260 is executed visually, but this configuration is not limiting. For example, there may be such a configuration that a camera for photographing the protective member 260 on a plan view, an acquiring portion which acquires a direction of the protective member 260 by analyzing an image photographed by the camera, and a direction-changing portion which changes the direction of the protective member 260 are provided. According to the configuration as above, the second surface 260*b* can be bonded to the discharge port surface 201*a* by the direction changing portion that changes the direction of the protective member 260 on the basis of information acquired by the acquiring portion and by automatically adsorbing the first surface 260*a* of the protective member 260 by the bonding device 900.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2023-186564, filed on Oct. 31, 2023, which is hereby incorporated by reference herein in its entirety.

What is claimed is:

1. A manufacturing method of a liquid discharge head including a liquid discharge chip and a protective member, the liquid discharge chip including a first substrate having a discharge port surface, in which a plurality of discharge ports discharging a liquid are formed, and a bonding surface, which faces in a direction opposite to the discharge port surface, and a second substrate bonded to the bonding surface of the first substrate and having a supply flow-passage formed therein for supplying the liquid toward the plurality of discharge ports; the protective member having an opening formed at a position overlapping the plurality of discharge ports when viewed in a direction perpendicular to the discharge port surface, and protecting the liquid discharge chip by being bonded to the discharge port surface; and moreover, in a state before being bonded to the liquid discharge chip, having a warp such that a center part of a first surface of the protective member becomes convex, the manufacturing method of the liquid discharge head comprising a bonding process of bonding a second surface, which is on an opposite side to the first surface of the protective member, to the discharge port surface.

2. The manufacturing method of a liquid discharge head according to claim 1, wherein in the bonding process, the protective member is bonded to the discharge port surface in a state where the first surface is made flat.

3. The manufacturing method of a liquid discharge head according to claim 2, further comprising:

a protective-member forming process of cutting out the protective member from a coil material in which a plate-shaped continuous material is wound, the protective-member forming process being performed before the bonding process.

4. The manufacturing method of a liquid discharge head according to claim 1, wherein the plurality of discharge ports are aligned in a first direction and form a discharge port row, and wherein, when viewed in the direction perpendicular to the discharge port surface, the protective member has an asymmetrical shape relative to a center line in the first direction and an asymmetrical shape relative to a center line in a second direction parallel to the discharge port surface and orthogonal to the first direction.

5. A liquid discharge head, comprising:

a liquid discharge chip in which a plurality of discharge ports discharging a liquid are aligned in a first direction and constitute a discharge port row, the liquid discharge head including a first substrate having a discharge port surface, in which the discharge ports are formed, and a bonding surface, which faces in a direction opposite to the discharge port surface, and a second substrate bonded to the bonding surface of the first substrate and having a supply flow-passage formed therein for supplying the liquid toward the plurality of discharge ports; and a plate-shaped protective member having an opening formed at a position overlapping the plurality of discharge ports when viewed in a direction perpendicular to the discharge port surface and being bonded to the discharge port surface and protecting the liquid discharge chip, wherein the protective member has a warp in a state before being bonded to the liquid discharge chip and has an identification portion for identifying a warping direction in a state before being bonded to the liquid discharge chip, the identification portion being an asymmetrical shape relative to a center line in the first direction and an asymmetrical shape relative to a center line in a second direction parallel to the discharge port surface and orthogonal to the first direction.

6. The liquid discharge head according to claim 5, wherein the protective member is a plate member made of metal.

7. The liquid discharge head according to claim 5, wherein the protective member has a substantially rectangular shape when viewed in the direction perpendicular to the discharge port surface, one corner in four corners of the rectangular shape being a chamfered shape, and each of the other three corners of the four corners having an arc shape.

8. The liquid discharge head according to claim 5, wherein the protective member has a first hole, a second hole, and a third hole penetrating in the direction perpendicular to the discharge port surface, the first hole and the second hole being disposed at asymmetrical positions relative to the center line in the first direction, and the first hole and the third hole being disposed at asymmetrical positions relative to the center line in the second direction.

9. The liquid discharge head according to claim 5, wherein the protective member and the liquid discharge chip are bonded via an adhesive, wherein the protective member has a hole portion penetrating in the direction perpendicular to the discharge port surface, the hole portion being provided at a position overlapping the adhesive interposed between the protective member and the liquid discharge chip when viewed in the direction perpendicular to the discharge port surface, and wherein, inside the hole portion, the adhesive enters.

10. The liquid discharge head according to claim 5, further comprising:

a frame member bonded to the protective member via an adhesive, wherein the protective member has a hole portion penetrating in the direction perpendicular to the discharge port surface, the hole portion being provided at a position overlapping the adhesive interposed between the protective member and the frame member when viewed in a direction perpendicular to the discharge port surface, and wherein, inside the hole portion, the adhesive enters.

11. The liquid discharge head according to claim 5, wherein a thickness of the protective member in the direction perpendicular to the discharge port surface is 0.3 mm or less.

12. The liquid discharge head according to claim 5, comprising a plurality of liquid discharge chips, each being the liquid discharge chip, and comprising a plurality of protective members, each being the protective member, wherein a number of the protective members is a same as that of the liquid discharge chips.

13. The liquid discharge head according to claim 5, wherein a width in the first direction of the first substrate is larger than a width in the first direction of the second substrate.

14. The liquid discharge head according to claim 5, wherein a width in the second direction of the first substrate is larger than a width in the second direction of the second substrate.

15. The liquid discharge head according to claim 5, wherein a thickness of the first substrate in the direction perpendicular to the discharge port surface is 0.3 mm or less.

16. The liquid discharge head according to claim 5, wherein the protective member overlaps an outer-peripheral edge part of the liquid discharge chip when viewed in the direction perpendicular to the discharge port surface.

17. The liquid discharge head according to claim 5, wherein in the discharge port surface of the liquid discharge chip, a region overlapping the opening of the protective member when viewed in the direction perpendicular to the discharge port surface is a region to which water-repellant treatment has been applied, while a region overlapping a part other than the opening of the protective member is a region to which the water-repellant treatment has not been applied.

18. A recording device, comprising:

a conveyor configured to convey a recording medium; and a liquid discharge head that discharges ink toward the recording medium, wherein the liquid discharge head includes:

a liquid discharge chip in which a plurality of discharge ports discharging a liquid are aligned in a first direction and constitute a discharge port row, the liquid discharge head including a first substrate having a discharge port surface, in which a plurality of discharge ports are formed, and a bonding surface, which faces a direction opposite to the discharge port surface, and a second substrate bonded to the bonding surface of the first substrate and having a supply flow-passage formed therein for supplying a liquid toward the plurality of discharge ports; and a plate-shaped protective member having an opening formed at a position overlapping the plurality of discharge ports when viewed in a direction perpendicular to the discharge port surface and being bonded to the discharge port surface and protecting the liquid discharge chip, wherein the protective member has a warp in a state before being bonded to the liquid discharge chip and has an identification portion for identifying a warping direction in a state before being bonded to the liquid discharge chip, the identification portion being an asymmetrical shape relative to a center line in the first direction and an asymmetrical shape relative to a center line in a second direction parallel to the discharge port surface and orthogonal to the first direction.

* * * * *